US012496843B2

(12) United States Patent
Higashi et al.

(10) Patent No.: US 12,496,843 B2
(45) **Date of Patent: *Dec. 16, 2025**

(54) PRINT CASSETTE

(71) Applicant: BROTHER KOGYO KABUSHIKI KAISHA, Nagoya (JP)

(72) Inventors: Kosuke Higashi, Nagoya (JP); Kentaro Murayama, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/706,549

(22) Filed: Mar. 28, 2022

(65) Prior Publication Data

US 2022/0219472 A1 Jul. 14, 2022

Related U.S. Application Data

(63) Continuation of application No. PCT/JP2020/034874, filed on Sep. 15, 2020.

(30) Foreign Application Priority Data

Sep. 30, 2019 (JP) ................................ 2019-178431

(51) Int. Cl.
*B41J 32/00* (2006.01)

(52) U.S. Cl.
CPC .................................... *B41J 32/00* (2013.01)

(58) Field of Classification Search
None
See application file for complete search history.

(56) References Cited

U.S. PATENT DOCUMENTS

| | | | | |
|---|---|---|---|---|
| 3,639,697 | A * | 2/1972 | Koguma .............. | G11B 15/615 242/338.1 |
| 3,672,603 | A | 6/1972 | Swain | |
| 3,804,227 | A | 4/1974 | Cappotto et al. | |
| 3,823,808 | A | 7/1974 | Murata et al. | |
| 3,948,382 | A | 4/1976 | Nesbitt et al. | |
| 4,034,935 | A | 7/1977 | Plaza et al. | |

(Continued)

FOREIGN PATENT DOCUMENTS

| | | |
|---|---|---|
| CN | 1252357 A | 5/2000 |
| CN | 1313197 A | 9/2001 |

(Continued)

OTHER PUBLICATIONS

Extended European Search Report in corresponding European Patent Application No. 20870968.3 issued Aug. 14, 2023.

(Continued)

*Primary Examiner* — Alejandro Valencia
(74) *Attorney, Agent, or Firm* — KENEALY VAIDYA LLP

(57) ABSTRACT

A print cassette includes a print tape roll in which a print tape is wound around a winding central axis parallel to a first direction, an input gear to which a driving force is to be input from outside, an idle gear directly or indirectly engaging the input gear and the output gear to transmit the driving force input to the input gear to the output gear. At least a portion of the input gear, at least a portion of the output gear, and at least a portion of the idle gear each overlap the print tape roll in the first direction.

16 Claims, 15 Drawing Sheets

(56) References Cited

U.S. PATENT DOCUMENTS

| | | | | | |
|---|---|---|---|---|---|
| 4,252,450 | A | | 2/1981 | Goodman et al. | |
| 4,351,619 | A | | 9/1982 | Duke et al. | |
| 4,397,574 | A | | 8/1983 | Wojdyla | |
| 4,402,619 | A | | 9/1983 | Paque et al. | |
| 4,490,059 | A | | 12/1984 | Daughters | |
| 4,499,513 | A | | 2/1985 | Umeda | |
| 4,538,931 | A | | 9/1985 | Nagashima | |
| 4,565,128 | A | | 1/1986 | Moriyama et al. | |
| 4,598,780 | A | | 7/1986 | Wasaki et al. | |
| 4,668,961 | A | | 5/1987 | Hiramatsu | |
| 4,832,514 | A | | 5/1989 | Basile | |
| 4,856,921 | A | | 8/1989 | Hatakeyama | |
| 5,099,378 | A | | 3/1992 | Turgeon | |
| 5,145,268 | A | | 9/1992 | Cavallini | |
| 5,325,114 | A | | 6/1994 | Fogle et al. | |
| 5,402,954 | A | | 4/1995 | Skavnak et al. | |
| 5,435,657 | A | | 7/1995 | Pearce et al. | |
| 5,472,286 | A | | 12/1995 | Jemura et al. | |
| 5,595,447 | A | | 1/1997 | Takayama et al. | |
| 5,619,244 | A | | 4/1997 | Manna | |
| 5,645,360 | A | | 7/1997 | Wane et al. | |
| 5,713,677 | A | | 2/1998 | Petoskey | |
| 5,788,387 | A | | 8/1998 | Takayama et al. | |
| 5,917,532 | A | | 6/1999 | Cornell et al. | |
| 5,959,652 | A | | 9/1999 | Privin | |
| 6,042,280 | A | * | 3/2000 | Yamaguchi .............. | B26D 5/00 400/615.2 |
| 6,126,344 | A | | 10/2000 | Takayama et al. | |
| 6,132,120 | A | | 10/2000 | Yamaguchi et al. | |
| 6,135,657 | A | | 10/2000 | Martinez et al. | |
| 6,190,067 | B1 | | 2/2001 | Kobayashi et al. | |
| 6,386,774 | B1 | | 5/2002 | Takayama et al. | |
| 6,511,238 | B1 | | 1/2003 | Glize | |
| 8,162,553 | B2 | | 4/2012 | Vandermeulen | |
| 9,566,808 | B2 | | 2/2017 | Yamaguchi et al. | |
| 11,840,069 | B2 | * | 12/2023 | Ukai ........................ | B41J 15/04 |
| 2002/0012558 | A1 | | 1/2002 | Huss et al. | |
| 2002/0067943 | A1 | | 6/2002 | Furuya et al. | |
| 2004/0031875 | A1 | | 2/2004 | Nonomura | |
| 2004/0056143 | A1 | | 3/2004 | Nonomura | |
| 2004/0161278 | A1 | | 8/2004 | Harada | |
| 2005/0031393 | A1 | | 2/2005 | Kishi et al. | |
| 2006/0146081 | A1 | | 7/2006 | Vandermeulen et al. | |
| 2006/0165461 | A1 | | 7/2006 | Vandermeulen et al. | |
| 2006/0238600 | A1 | | 10/2006 | Vandermeulen et al. | |
| 2006/0238800 | A1 | | 10/2006 | Czudak et al. | |
| 2007/0009302 | A1 | | 1/2007 | Vandermeulen et al. | |
| 2007/0172286 | A1 | | 7/2007 | Pomfret | |
| 2008/0080922 | A1 | | 4/2008 | Vandermeulen | |
| 2008/0084494 | A1 | | 4/2008 | Pomfret | |
| 2008/0298872 | A1 | | 12/2008 | Kubota et al. | |
| 2010/0166475 | A1 | | 7/2010 | Yamaguchi et al. | |
| 2010/0166477 | A1 | | 7/2010 | Yamaguchi et al. | |
| 2010/0166478 | A1 | | 7/2010 | Yamaguchi et al. | |
| 2010/0166479 | A1 | | 7/2010 | Yamaguchi et al. | |
| 2010/0166480 | A1 | | 7/2010 | Yamaguchi et al. | |
| 2010/0247205 | A1 | | 9/2010 | Yamaguchi et al. | |
| 2010/0247206 | A1 | | 9/2010 | Yamaguchi et al. | |
| 2010/0254742 | A1 | | 10/2010 | Yamaguchi et al. | |
| 2015/0283836 | A1 | | 10/2015 | Sakano et al. | |
| 2016/0114598 | A1 | | 4/2016 | Kawakami et al. | |
| 2016/0236495 | A1 | | 8/2016 | Sakano et al. | |
| 2016/0368275 | A1 | | 12/2016 | Sakano et al. | |
| 2016/0368294 | A1 | | 12/2016 | Sakano et al. | |
| 2018/0037043 | A1 | | 2/2018 | Sakano et al. | |
| 2019/0030935 | A1 | | 1/2019 | Sakano et al. | |
| 2020/0147988 | A1 | | 5/2020 | Sakano et al. | |
| 2022/0219468 | A1 | | 7/2022 | Murayama | |

FOREIGN PATENT DOCUMENTS

| | | | |
|---|---|---|---|
| CN | 1376115 | A | 10/2002 |
| CN | 1469811 | A | 1/2004 |
| CN | 1469812 | A | 1/2004 |
| CN | 1533332 | A | 9/2004 |
| CN | 1579796 | A | 2/2005 |
| CN | 101022956 | A | 8/2007 |
| CN | 101318415 | A | 12/2008 |
| CN | 101683790 | A | 3/2010 |
| CN | 102092201 | A | 6/2011 |
| CN | 103273748 | A | 9/2013 |
| CN | 203799182 | U | 8/2014 |
| CN | 105538907 | A | 5/2016 |
| CN | 106132712 | A | 11/2016 |
| EP | 0414544 | A2 | 2/1991 |
| GB | 2016411 | A | 9/1979 |
| JP | S50-36734 | B1 | 11/1975 |
| JP | S54-111914 | A | 9/1979 |
| JP | S58-141479 | A | 8/1983 |
| JP | S59-6460 | A | 1/1984 |
| JP | S59-95180 | A | 6/1984 |
| JP | S60-8072 | U | 1/1985 |
| JP | S60-9657 | U | 1/1985 |
| JP | S60-24565 | A | 2/1985 |
| JP | S60-36255 | U | 3/1985 |
| JP | S60-46254 | U | 4/1985 |
| JP | S60-48456 | U | 4/1985 |
| JP | S60-188821 | A | 9/1985 |
| JP | S60-224571 | A | 11/1985 |
| JP | S61-154877 | A | 7/1986 |
| JP | S62-103179 | U | 5/1987 |
| JP | S63-156762 | U | 10/1988 |
| JP | H02-6173 | A | 1/1990 |
| JP | H02-9562 | U | 1/1990 |
| JP | H02-11379 | A | 1/1990 |
| JP | H02-11380 | A | 1/1990 |
| JP | H02-37568 | Y2 | 10/1990 |
| JP | H03-97181 | A | 4/1991 |
| JP | H03-284973 | A | 12/1991 |
| JP | H04-152176 | A | 5/1992 |
| JP | H05-41834 | U | 6/1993 |
| JP | H05139006 | A | 6/1993 |
| JP | H05-53956 | A | 7/1993 |
| JP | H07-9745 | A | 1/1995 |
| JP | H07-32710 | A | 2/1995 |
| JP | H07-276755 | A | 10/1995 |
| JP | H07-276757 | A | 10/1995 |
| JP | H08-183204 | A | 7/1996 |
| JP | H08-183232 | A | 7/1996 |
| JP | H08183230 | A | 7/1996 |
| JP | 2000-6504 | A | 1/2000 |
| JP | 2000-103149 | A | 4/2000 |
| JP | 2001-47713 | A | 2/2001 |
| JP | 2002-104717 | A | 4/2002 |
| JP | 2002-211092 | A | 7/2002 |
| JP | 2005-280060 | A | 10/2005 |
| JP | 2007-502221 | A | 2/2007 |
| JP | 2008-261968 | A | 10/2008 |
| JP | 2009-196804 | A | 9/2009 |
| JP | 2011-46142 | A | 3/2011 |
| JP | 2011-098525 | A | 5/2011 |
| JP | 2011-148167 | A | 8/2011 |
| JP | 2011-150007 | A | 8/2011 |
| JP | 2011-207194 | A | 10/2011 |
| JP | 2012135931 | A | 7/2012 |
| JP | 2012-158175 | A | 8/2012 |
| JP | 2012-236307 | A | 12/2012 |
| JP | 2014-170142 | A | 9/2014 |
| JP | 2015-182318 | A | 10/2015 |
| JP | 2017-30333 | A | 2/2017 |
| WO | 2005/018944 | A1 | 3/2005 |
| WO | 2010125127 | A1 | 11/2010 |
| WO | 2021/065470 | A1 | 4/2021 |

OTHER PUBLICATIONS

International Search Report for PCT/JP2020/034874 dated Nov. 2, 2020.

International Preliminary Report On Patentability dated Apr. 5, 2022 and Written Opinion of the International Search Report for PCT/JP2020/034874 dated Nov. 2, 2020.

(56) References Cited

OTHER PUBLICATIONS

Chinese Office Action for the related Chinese Patent Application No. 202080068302.6 dated Feb. 18, 2024.
European Office Action for the related European Patent Application No. 20870968.3 dated Mar. 25, 2024.
Japanese Office Action for the related Japanese Patent Application No. 2023-121495 dated Jul. 23, 2024.
Chinese Office Action for the related Chinese Patent Application No. 202080068302.6 dated Aug. 7, 2024.
International Search Report and Written Opinion of the International Search Report for PCT/JP2020/034869 dated Nov. 10, 2020.
International Preliminary Report On Patentability and English language Written Opinion pf of the International Search Report for PCT/JP2020/034869 dated Apr. 5, 2022.
Chinese Office Action for Chinese Application No. 202080066599.2 dated Feb. 7, 2024.

* cited by examiner

PRINT CASSETTE

CROSS-REFERENCE TO RELATED APPLICATION

This is a continuation application of International Application No. PCT/JP2020/034874 filed on Sep. 15, 2020 which claims priority from Japanese Patent Application No. 2019-178431 filed on Sep. 30, 2019. The entire contents of the earlier applications are incorporated herein by reference.

TECHNICAL FIELD

The present disclosure relates to a print cassette.

BACKGROUND

In a printing apparatus that performs printing on a tape, the tape is replaced and supplied by attaching and detaching a cassette homing the tape to and from a printing apparatus main body. In such a cassette, it is known that a plurality of gears for transmitting a driving force, for example, for conveying a tape, are provided inside the cassette (refer to Patent Literature.

SUMMARY

According to an aspect of the disclosure, a print cassette includes a print tape roll in which a print tape is wound around a winding central axis parallel to a first direction, an input gear to which a driving force is to be input from outside, an output gear to output the driving force outside, and an idle gear directly or indirectly engaging the input gear and the output gear to transmit the driving force input to the input gear to the output gear. At least a portion of the input gear, at least a portion of the output gear, and at least a portion of the idle gear each overlap the print tape roll in the first direction.

DETAILED DESCRIPTION

In the cassette described in the above-mentioned publication, a plurality of gears are aligned in a direction perpendicular to rotation axes of the gears together with a spool for supplying tape. The cassette thus increases in size in this direction.

Aspects of the present disclosure provide a print cassette which can be downsized in a direction perpendicular to rotation axes of gears while disposing the gears for transmitting a driving force.

1. First Embodiment

[1-1. Configuration]

Figure 1A:
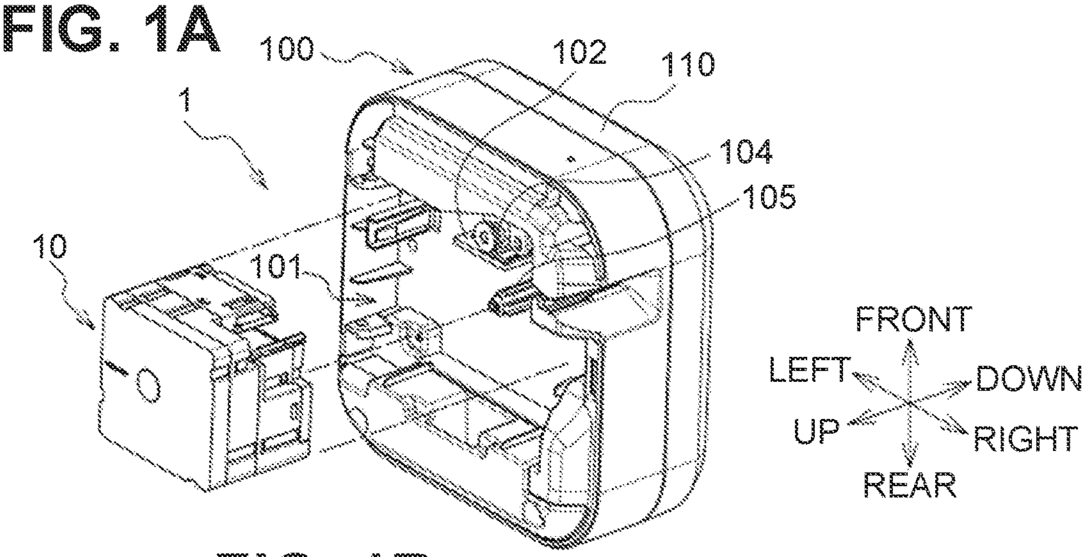
FIGS. 1A, 1B, and 1C are schematic perspective views illustrating a state in which a print cassette is detached from a printing apparatus main body in a printing apparatus according to an embodiment.
Figure 1B:
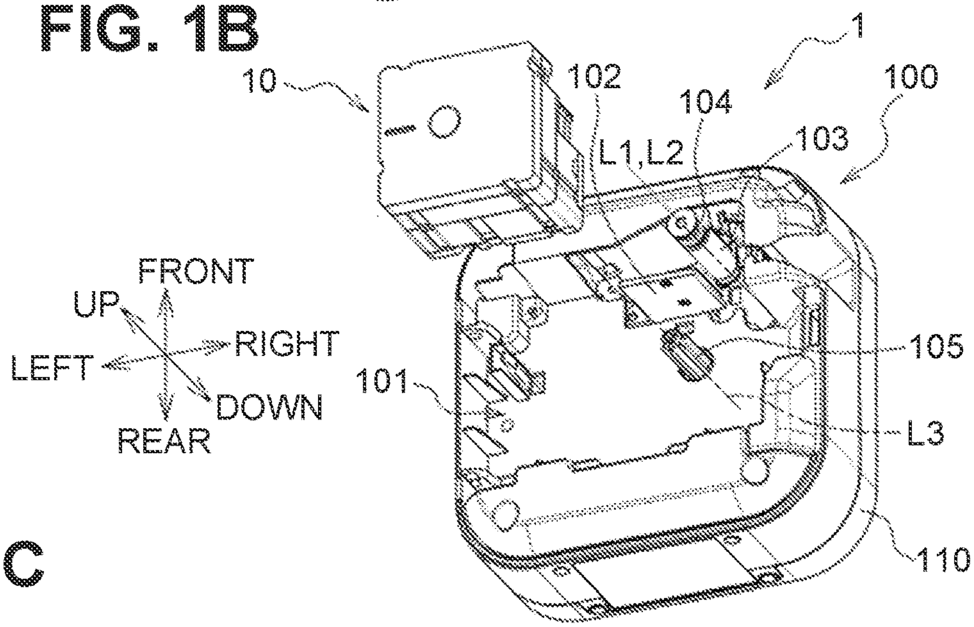
Figure 1C:
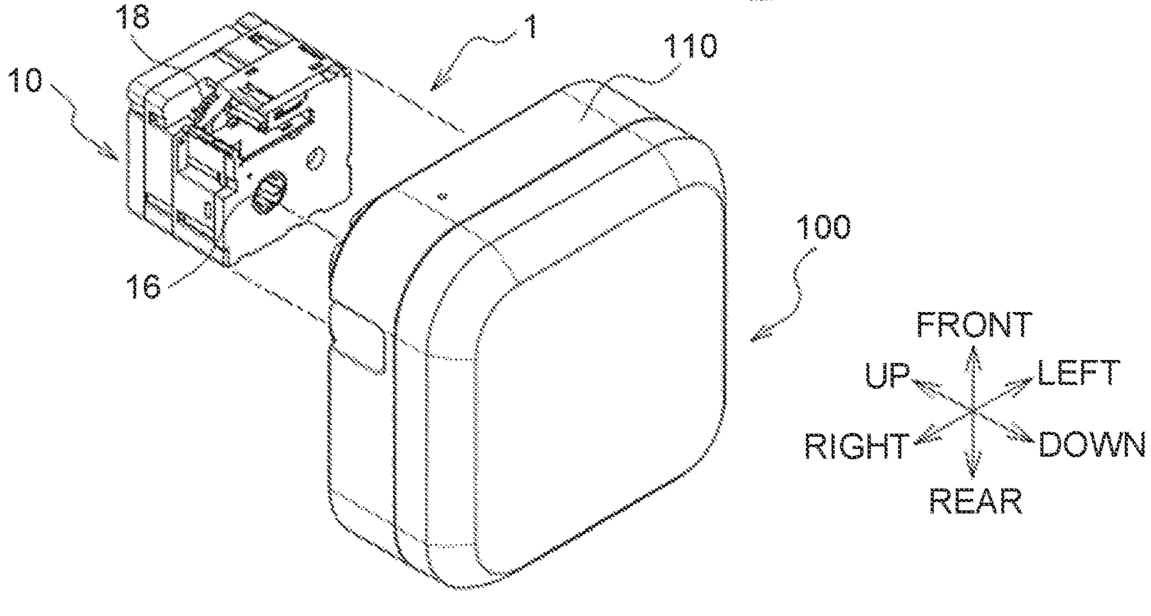

A printing apparatus 1 illustrated in FIGS. 1A, 1B, and 1C includes a print cassette 10 and a printing apparatus main body 100. The printing apparatus 1 is an apparatus that performs printing on a tape print medium.

In the present embodiment, an axial direction of an output gear 18 of a print cassette 10 and an axial direction of a platen gear 104 of the printing apparatus main body 100 are an up-down direction, a direction perpendicular to the up-down direction in which the output gear 18 and an input spool 16 are aligned (that is, a direction in which the platen gear 104 and a drive shaft 105 are aligned) is a front-rear direction, and a direction perpendicular to both the up-down direction and the front-rear direction is a left-right direction.

In the present specification, the term "parallel" is not limited to strictly parallel, also includes the concept of "substantially parallel". That is, each rotation axis may be located to be slightly inclined with respect to the up-down direction as long as the rotation axis is within a range in which the function of the printing apparatus 1 is exhibited (or a range in which, for example, a print tape 11A and an ink ribbon 14A are conveyable).

Printing Apparatus Main Body

The printing apparatus main body 100 includes a cassette insertion portion 101, a print head 102, a platen roller 103, a platen gear 104, the drive shaft 105, and a housing 110.

Cassette Insertion Portion

The cassette insertion portion 101 is a recessed portion to which the print cassette 10 is attached. The cassette insertion portion 101 has a function of positioning the print cassette 10. The cassette insertion portion 101 is provided in the housing 110.

Print Head

The print head 102 is disposed in an interior of the cassette insertion portion 101. The print head 102 has a plurality of heating elements whose heat generation is to be individually controlled.

Platen Roller

A rotation axis L1 of the platen roller 103 is parallel to the up-down direction. The platen roller 103 is disposed near the print head 102 in the interior of the cassette insertion portion 101. The platen roller 103 is swingable in a direction toward or away from the print head 102.

Platen Gear

The platen gear 104 is coupled to the platen roller 103. In the present embodiment, a rotation axis L2 of the platen gear 104 is located collinearly with the rotation axis L1 of the platen roller 103. The platen gear 104 is swingable together with the platen roller 103.

Drive Shaft

The drive shaft 105 is inserted into the input spool 16. The drive shaft 105 rotates the input spool 16.

The drive shaft 105 is disposed in the interior of the cassette insertion portion 101. A rotation axis L3 of the drive shaft 105 is parallel to the up-down direction. The drive shaft 105 is rotated about the rotation axis L3 by a drive source (for example, a motor), which is not illustrated.

Print Cassette

The print cassette 10 houses a print medium. The print cassette 10 is attachable to and detachable from the printing apparatus main body 100. By replacing the print cassette 10, a print medium can be supplied and the type (for example, color, material, etc.) of print medium can be changed.

Figures 2A, 2B, 2C:
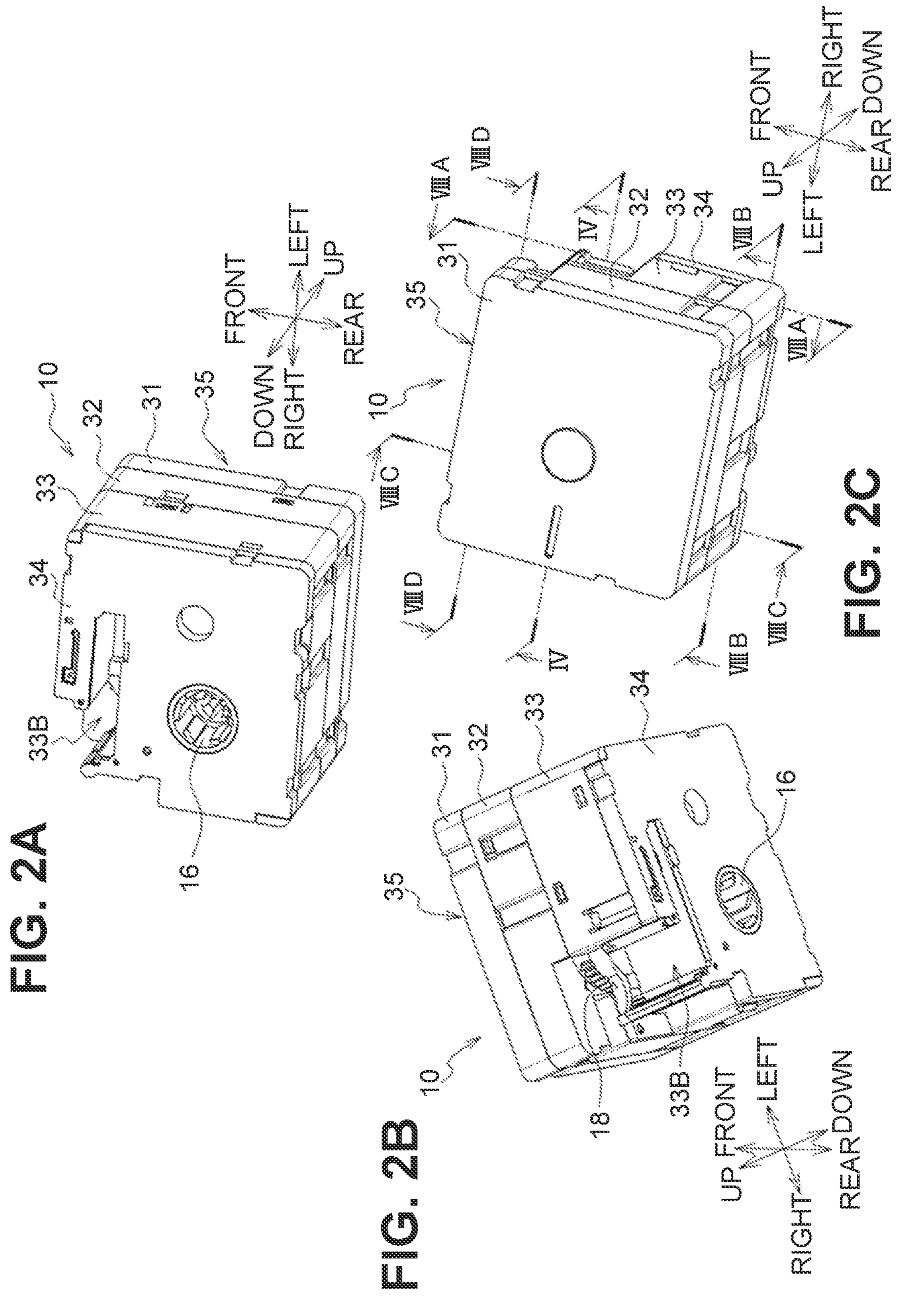
FIGS. 2A, 2B and 2C are schematic perspective views of the print cassette in the printing apparatus of FIG. 1A.

As illustrated in FIGS. 2A, 2B, and 2C, the print cassette 10 includes a case 35 that houses the print tape 11A, the ink ribbon 14A, and the like. The outer shape of the print cassette 10 (i.e., the shape of the case 35) is a rectangular parallelepiped having sides parallel to the up-down direction, sides parallel to the front-rear direction, and sides parallel to the left-right direction. The case 35 has a first case portion 31, a first frame portion 32, a second frame portion 33, and a second case portion 34.

Figure 3:
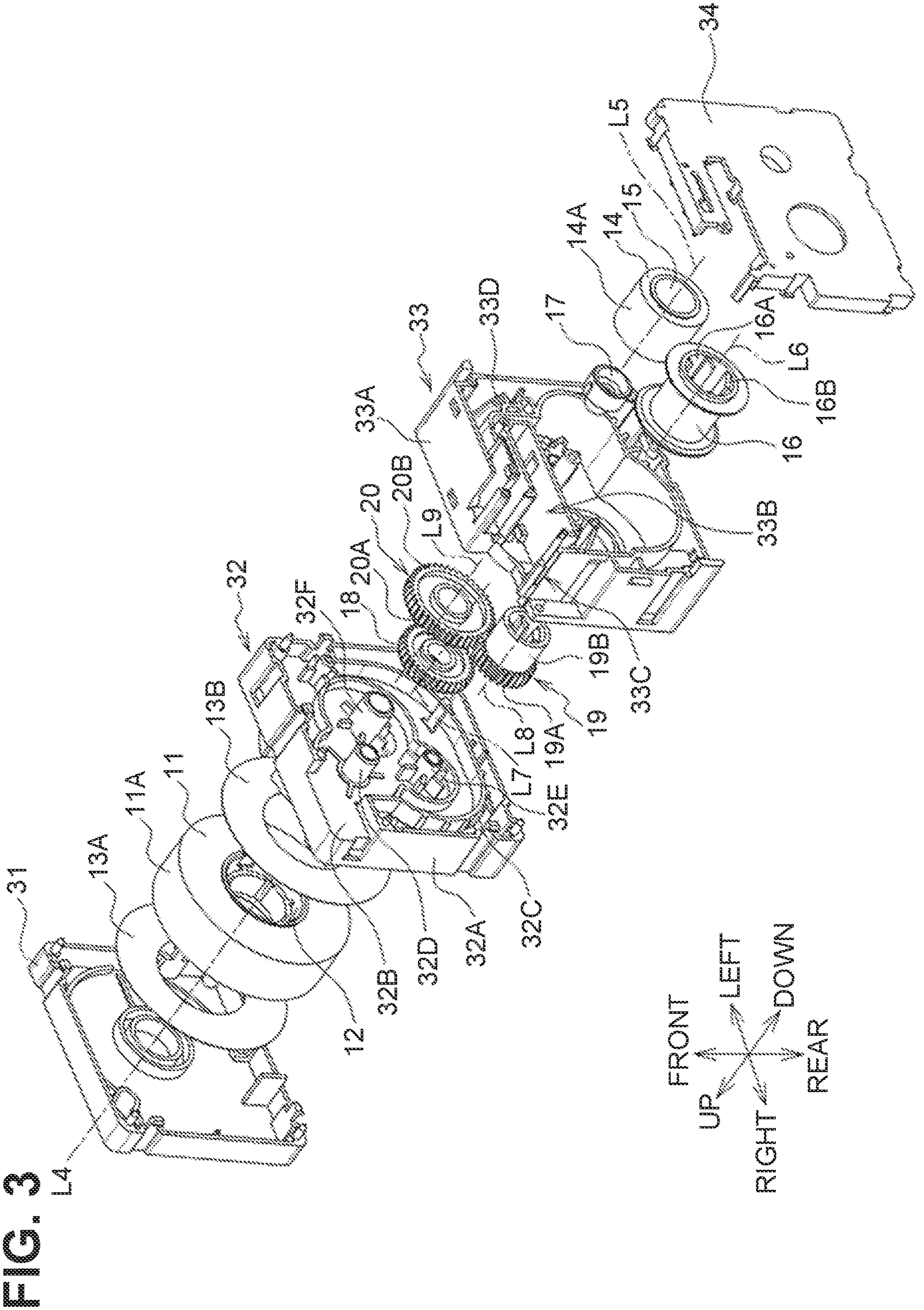
FIG. 3 is a schematic exploded perspective view of the prim cassette of FIG. 2A.

As illustrated in FIG. 3, the print cassette 10 includes a print tape roll 11, a first tape spool 12, spacer films 13A and 13B, an ink ribbon roll 14, a second tape spool 15, the input spool 16, a clutch spring holder 17, the output gear 18, an input gear 19, and an idle gear 20.

Print Tape Roll

In the print tape roll 11, the print tape 11A on which printing is to be performed is wound around the first tape spool 12.

In the print tape roll 11, the print tape 11A is wound around a winding central axis parallel to the up-down direction. Printing is performed on the print tape 11A by the print head 102 of the printing apparatus main body 100 and the ink ribbon 14A.

Two spacer films 13A and 13B are disposed on outer sides of the print tape roll 11 in the up-down direction in such a manner as to sandwich the print tape roll 11. The spacer film 13A is disposed between the print tape roll 11 and the first case portion 31 and the spacer film 13B is disposed between the print tape roll 11 and the first frame portion 32.

First Tape Spool

The first tape spool 12 is rotatable about a rotation axis L4. The first tape spool 12 rotates along with the platen roller 103 of the printing apparatus main body 100 conveying the print tape 11A, thereby supplying the print tape 11A to the print head 102.

Ink Ribbon Roll

In the ink ribbon roll 14, the ink ribbon 14A used for printing on the print tape 11A is wound around the second tape spool 15. In the ink ribbon roll 14, the ink ribbon 14A is wound around a winding central axis parallel to the up-down direction.

The ink ribbon 14A is overlapped with the print tape 11A in the head opening 33B and is used for printing by the print head 102. The ink ribbon 14A used for printing is taken up by the input spool 16.

The ink ribbon roll 14 is subjected to rotation pressure applied by a clutch spring held by a clutch spring holder 17. At least a portion of the ink ribbon roll 14 is disposed at a position overlapping the print tape roll 11 in the up-down direction.

Second Tape Spool

The second tape spool 15 is rotatable about a rotation axis L5. The rotation axis L5 of the second tape spool 15 is parallel to the rotation axis L4 of the first tape spool 12, that is, parallel to the up-down direction.

The second tape spool 15 rotates along with the input spool 16 taking up the ink ribbon 14A, thereby supplying the ink ribbon 14A to the print head 102.

Input Spool

The input spool 16 is rotatable about a rotation axis L6. The rotation axis L6 of the input spool 16 is parallel to the rotation axis L5 of the second tape spool 15.

The input spool 16 is cylindrical and has an inner peripheral surface 16A definint a hollow portion. The inner peripheral surface 16A of the input spool 16 is provided with spline teeth 16B. The spline teeth 16B engages the drive shaft 105 of the printing apparatus main body 100.

The input spool 16 is rotated by the drive shaft 105. The take-up spool 16 of the present embodiment is a take-up spool that is rotatable to take up the ink ribbon 14A to be supplied from the ink ribbon roll 14.

Output Gear

The output gear 18 is a single gear for outputting a driving force for conveying the print tape 11A to the outside.

Specifically, the output gear 18 outputs a driving force to the platen gear 104 of the printing apparatus main body 100. The rotation axis L7 of the output gear 18 is parallel to the rotation axis L5 of the second tape spool 15. The output gear 18 overlaps a cover portion 32B in the up-down direction.

The output gear 18 is partially exposed to the head opening 33B. The output gear 18 engages the platen gear 104 at the head opening 33B in a state in which the print cassette 10 is attached to the printing apparatus main body 100.

Figure 4:
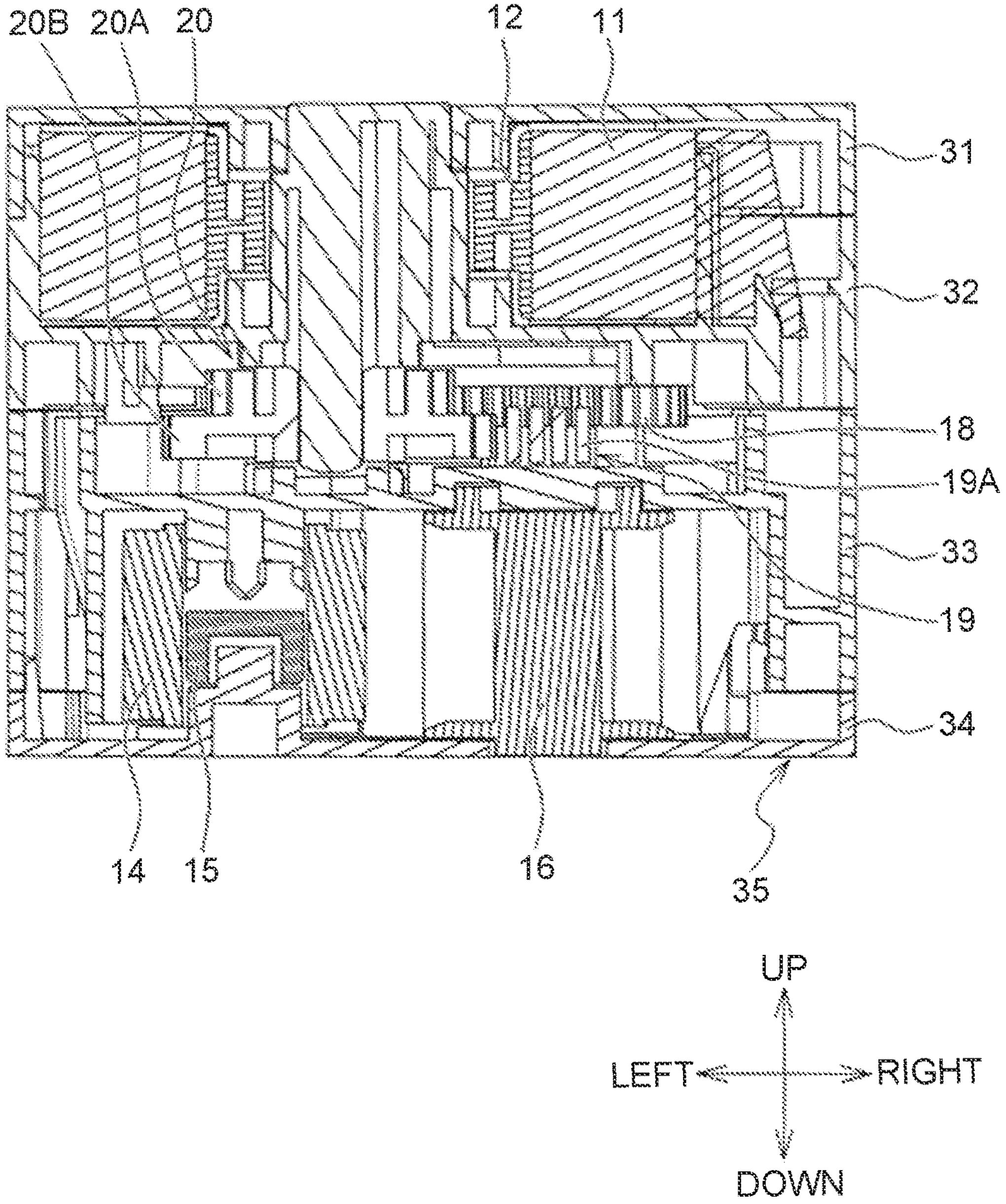
FIG. 4 is a schematic cross-sectional view taken along line IV-IV of FIG. 2C.

As illustrated in FIG. 4, the second tape spool 15, the output gear 18, and the print tape roll 11 are disposed in order of the second tape spool 15, the output gear 18, and the print tape roll 11 in the up-down direction. That is, the output gear 18 is positioned between the second tape spool 15 and the print tape roll 11 in the up-down direction.

Input Gear

The input gear 19 illustrated in FIG. 3 indirectly engages the output gear 18 via the idle gear 20 to transmit a driving force input from the printing apparatus main body 100 to the output gear 18.

The input gear 19 includes a gear 19A and a cylindrical spool 19B that is fixed to a surface of the gear 19A perpendicular to a rotation axis thereof and that has spline teeth on an inner peripheral surface of the spool 19B. The gear 19A is rotated integrally with the spool 19B by the driving force input to the spool 19B.

The input gear 19 is disposed such that the rotation axis L8 of the input gear 19 (i.e., the rotation axis of the gear 19A and the rotation axis of the spool 19B) is aligned with the rotation axis L6 of the input spool 16. A portion of the spool 19B is inserted into the input spool 16.

As illustrated in FIG. 4, the input spool 16, a portion of the input gear 19 (i.e., the gear 9A), and the print tape roll 11 are disposed in order of the input spool 16, the portion of the input gear 19 (i.e., the gear 19A), and the print tape roll 11 in the up-down direction.

The rotation axis L8 of the input gear 19 overlaps the hollow portion of the input spool 16 in the up-down direction. The drive shaft 105 is thus simultaneously inserted through the input spool 16 and the spool 19B of the input gear 19. As a result, although not directly coupled to the input spool 16, the input gear 19 is rotated by a common drive source (i.e., the drive shaft 105) with the input spool 16.

Idle Gear

The idle gear 20 directly engages the input gear 19 and the output gear 18. The idle gear 20 transmits the driving force input to the input gear 19 to the output gear 18. A rotation axis L9 of the idle gear 20 is parallel to the up-down direction.

The idle gear 20 is a stepped gear in which a first gear 20A engaging the output gear 18 and a second gear 20B engaging the input gear 19 are aligned coaxially. The second gear 20B has a larger diameter than the first gear 20A.

Further, the first gear 20A is disposed at a position closer to the print tape roll 11 than the second gear 20B is in the up-down direction (that is, higher than the second gear 20B). The idle gear 20 constitutes a speed reduction mechanism that reduces the rotational speed of the driving force input to the input gear 19.

Case

As illustrated in FIG. 3, the first case portion 31 constitutes an upper end portion of the print cassette 10. The first frame portion 32 is disposed below the first case portion 31 and connected to the first case portion 31 in the up-down direction.

The second frame portion 33 is disposed below the first frame portion 32 and connected to the first frame portion 32 in the up-down direction. The second case portion 34 constitutes a lower end portion of the print cassette 10. The second case portion 34 is connected to the second frame portion 33 in the up-down direction.

The first case portion 31 and the first frame portion 32 accommodate the print tape roll 11. That is, the print tape roll 11 is disposed in a space surrounded by the first case portion 31 and the first frame portion 32.

The second case portion 34 and the second frame portion 33 accommodate the ink ribbon roll 14, the second tape spool 15, and the input spool 16. That is, the ink ribbon roll 14, the second tape spool 15, and the input spool 16 are disposed in a space surrounded by the second case portion 34 and the second frame portion 33.

A portion of the output gear 18, the input gear 19, and the idle gear 20 are disposed in a space surrounded by the first frame portion 32 and the second frame portion 33. That is, the portion of the output gear 18, the input gear 19, and the idle gear 20 are accommodated in the first frame portion 32 and the second frame portion 33.

The first frame portion 32 includes a first side wall 32A, the cover portion 32B, a first guide 32C, a first gear shaft 32D, a second gear shaft 32E, and a third gear shaft 32F.

The first side wall 32A constitutes a side surface parallel to the up-down direction of the print cassette 10.

The cover portion 32B has a surface perpendicular to the up-down direction. The cover portion 32B is disposed at a position overlapping the output gear 18 in the up-down direction. In the present embodiment, the cover portion 32B is disposed at a right front corner portion of the first frame portion 32.

The first gear shaft 32D is inserted through the output gear 18 and rotatably supports the output gear 18. The second gear shaft 32E is inserted through the input gear 19 and rotatably supports the input gear 19. The third gear shaft 32F is inserted through the idle gear 20 and rotatably supports the idle gear 20.

Figure 5:
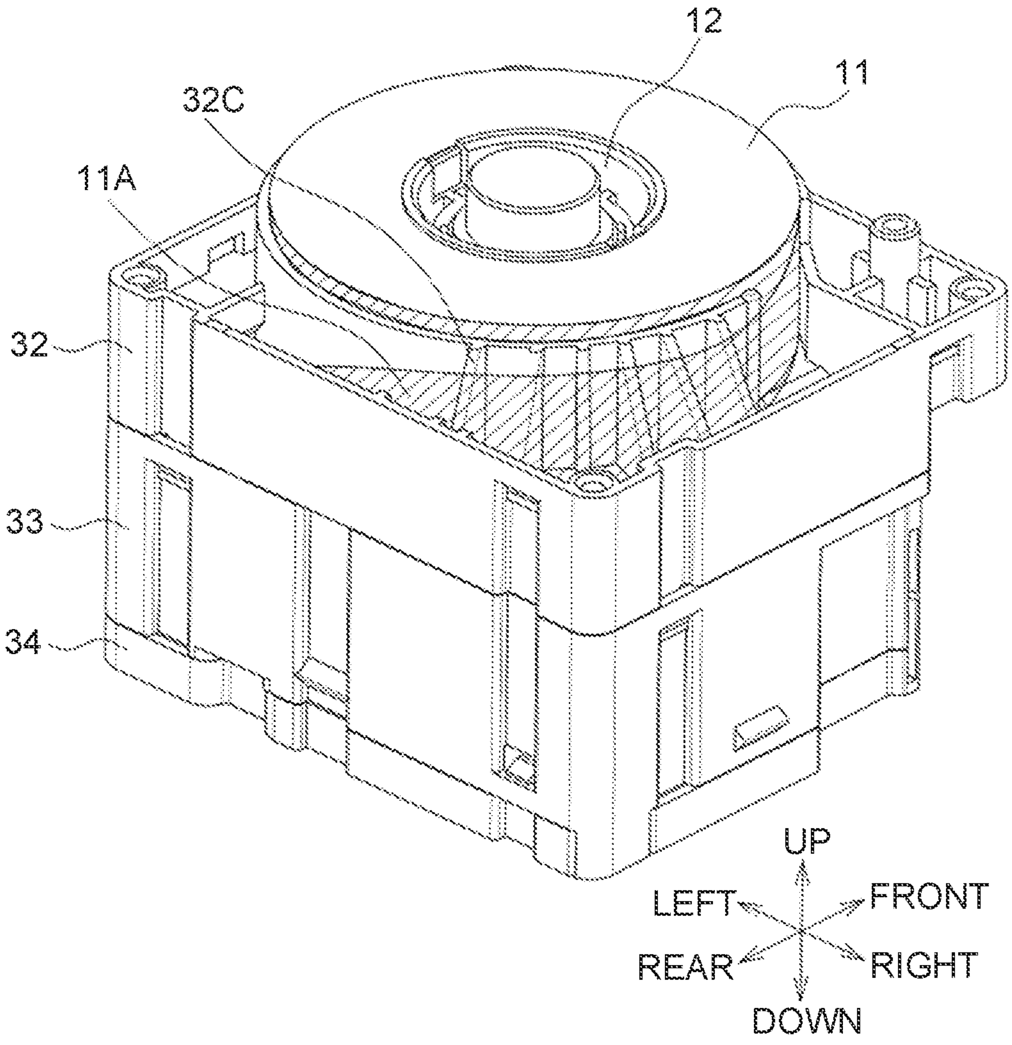
FIG. 5 is a schematic perspective view illustrating a state of the print cassette of FIG. 2C from which a first case portion is detached.

As illustrated in FIG. 5, the first guide 32C is a portion around which the print tape 11A pulled out from the print tape roll 11 is wound. The first guide 32C has a plurality of plate-shaped ribs spaced apart from each other in a circumferential direction of the print tape roll 11. Each of the ribs protrudes in a radial direction of the print tape roll 11, and a protrusion amount (that is, a plate width) increases downward.

As illustrated in FIG. 3, the second frame portion 33 includes a second side wall 33A, a head opening 33B, a discharge port 33C, and a second guide 33D.

The second side wall 33A constitutes a side surface parallel to the up-down direction of the print cassette 10.

The head opening 33B is a recessed portion that is recessed in the up-down direction toward the first frame portion 32 and extends in the left-right direction. The head opening 33B is a portion missing from the second side wall 33A, and opens downward in the print cassette 10.

When the print cassette 10 is attached to the printing apparatus main body 100, the print head 102 is inserted into the head opening 33B from below. In a state where the print cassette 10 is attached to the printing apparatus main body 100, the print head 102 is disposed in the head opening 33B.

The second guide 33D is a portion around which the print tape 11A having passed through the first guide 32C is wound. Similarly to the first guide 32C, the second guide 33D has a plurality of plate-shaped ribs spaced apart from each other in a circumferential direction of the ink ribbon roll 14. Each of the ribs protrudes in a radial direction of the ink ribbon roll 14, and a protrusion amount (that is, a plate width) decreases downward.

Positional Relationship of Roll, Spool, and Gear

Figure 6A:
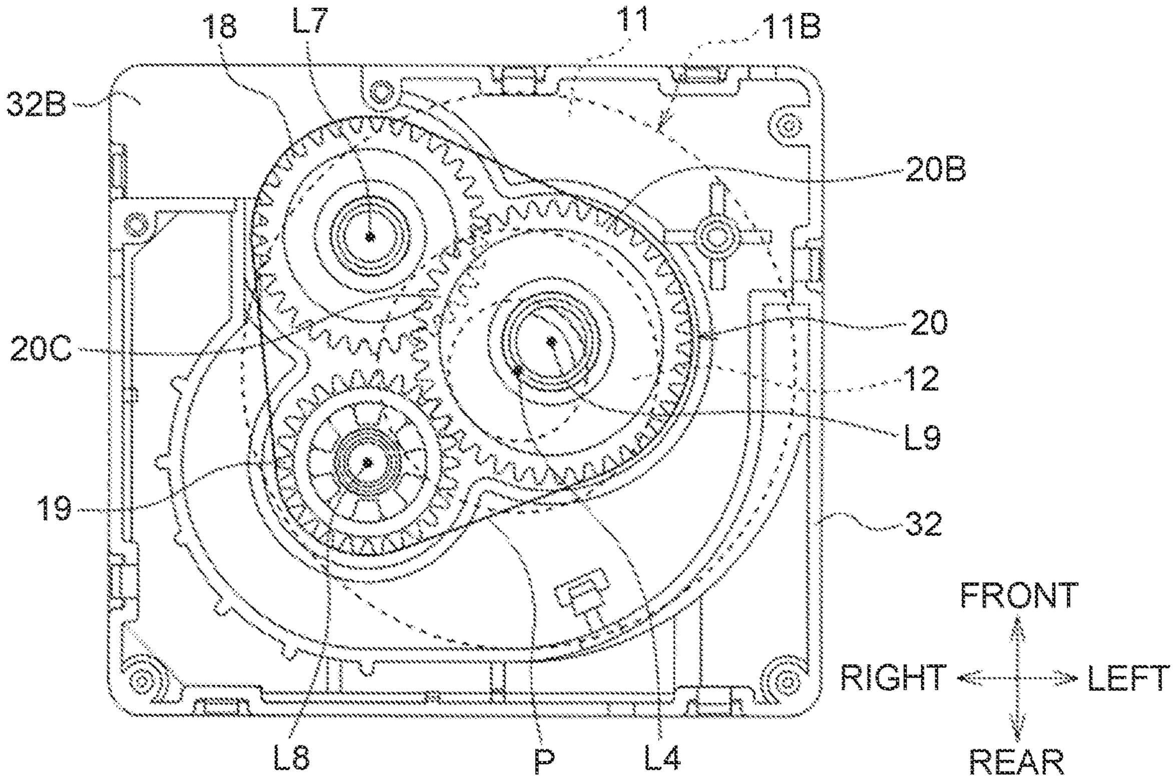
FIGS. 6A and 6B are schematic perspective views illustrating a state of the print cassette of FIG. 2A from which a second frame portion and a second case portion are detached.

As illustrated in FIG. 6A, a portion of the input gear 19, a portion of the output gear 18, and a portion of the idle gear 20 each overlap the print tape roll 11 in the up-down direction.

The rotation axis L8 of the input gear 19, the rotation axis L7 of the output gear 18, and the rotation axis L9 of the idle gear 20 are each located more inward than an outer peripheral surface 11B of the print tape roll 11 in the front-rear direction and the left-right direction.

Further, in a projection view in which the first tape spool 12, the input gear 19, the output gear 18, and the idle gear 20 are projected onto a virtual plane perpendicular to the up-down direction, the rotation axis L4 of the first tape spool 12 overlaps a convex envelope P defined by the input gear 19, the output gear 18, and the idle gear 20. The convex envelope P also overlaps a portion of the first tape spool 12 and a portion of the print tape roll 11.

The second gear 20B of the idle gear 20 has an overlapping portion 20C that overlaps the output gear 18 in the up-down direction. A portion of the overlapping portion 20C of the second gear 20B overlaps the print tape roll 11 in the up-down direction. The portion of the overlapping portion 20C of the second gear 20B overlaps the first tape spool 12 in the up-down direction.

Figure 6B:
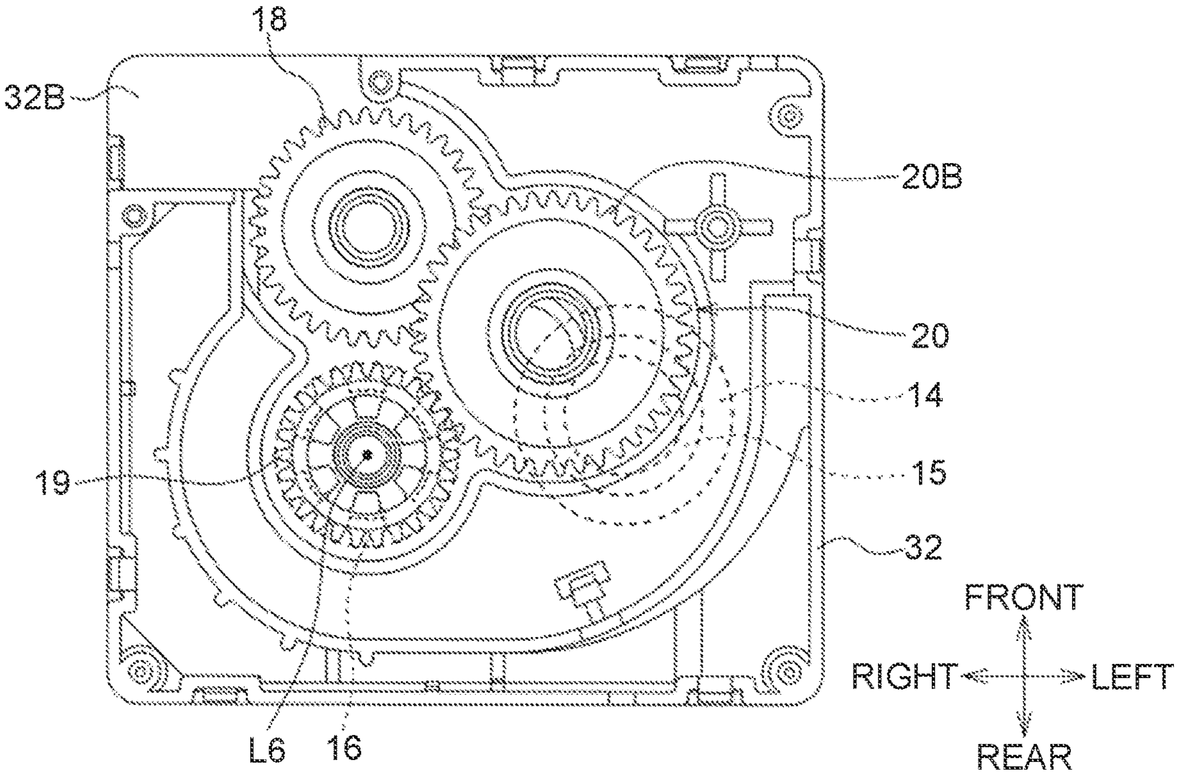

As illustrated in FIG. 6B, a portion of the ink ribbon roll 14 and a portion of the second tape spool 15 each overlap the idle gear 20 in the up-down direction. A portion of the input spool 16 also overlaps the idle gear 20 in the up-down direction. The outer edge of the input spool 16 illustrated in FIG. 6B includes flanges provided at both ends in the axial direction of the rotation axis L6 of the input spool 16.

Figure 7:
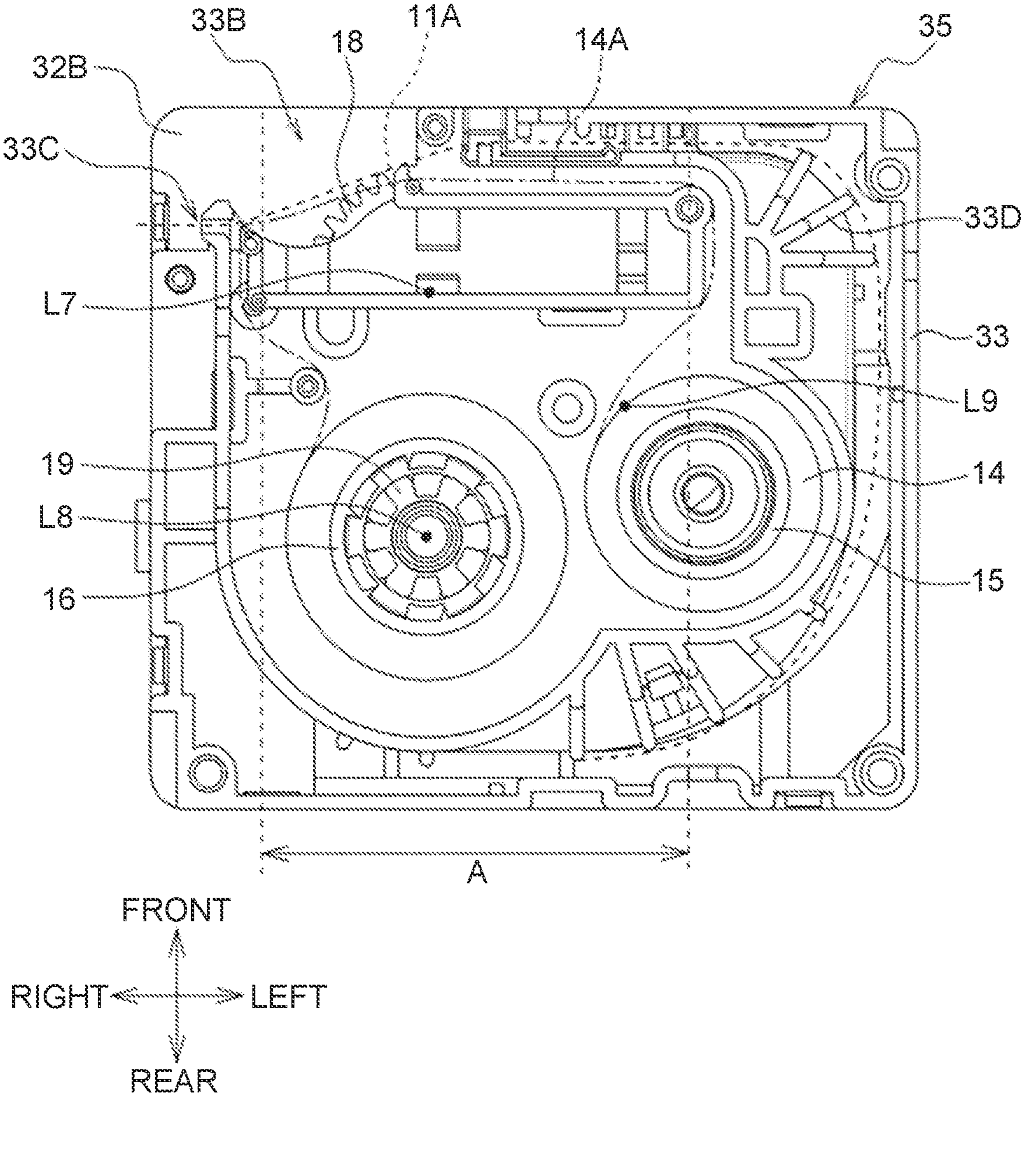
FIG. 7 is a schematic view for explaining passages of a print tape and an ink ribbon in the print cassette of FIG. 2A.

As illustrated in FIG. 7, the rotation axis L8 of the input gear 19, the rotation axis L7 of the output gear 18, and the rotation axis L9 of the idle gear 20 are each located between both ends of the head opening 33B in the left-right direction (i.e., in a region A overlapping the head opening 33B in the front-rear direction).

The rotation axis L8 of the input gear 19 and the rotation axis L9 of the idle gear 20 are each located behind the head opening 33B The rotation axis L7 of the output gear 18 passes through the head opening 33B.

Tape Conveyance in Cassette

As illustrated in FIG. 7, the print tape 11A and the ink ribbon 14A are laid across the head opening 33B in the left-right direction. The printed print tape 11A is discharged from the discharge port 33C outside the printing apparatus 1. A portion of the output gear 18 is located in the head opening 33B. The cover portion 32B is exposed in the head opening 33B.

As illustrated in FIGS. 8A, 8B, 8C, and 8D, the first guide 32C and the second guide 33D constitute a passage through which the print tape 11A constituting the print tape roll 11 is fed from the first frame portion 32 to the second frame portion 33.

Figure 8A:
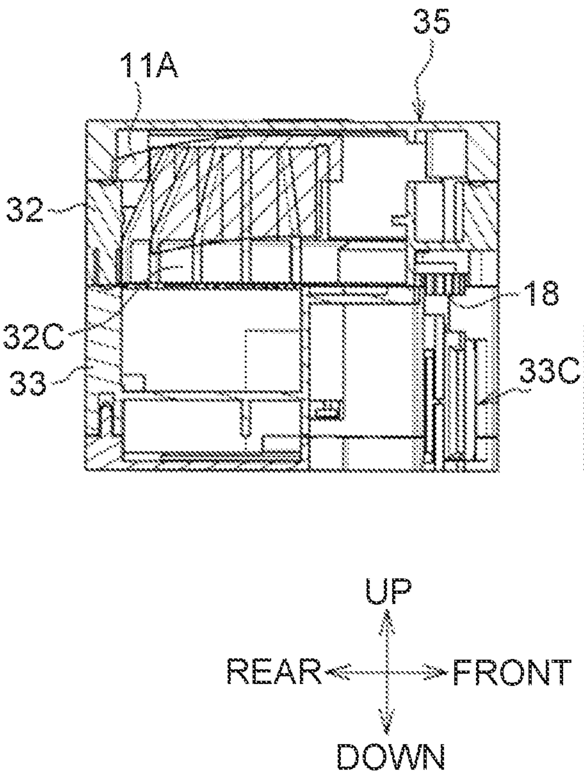
FIG. 8A is a schematic cross-sectional view taken along line of FIG. 2C.
Figure 8B:
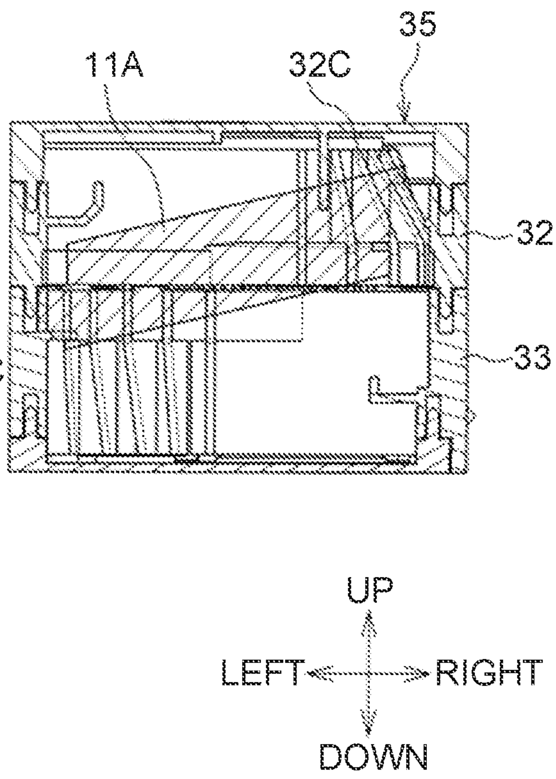
FIG. 8B is a schematic cross-sectional view taken along line of FIG. 2C.

Specifically, as illustrated in FIG. 8A, the print tape 11A pulled out from the print tape roll 11 is conveyed in a spiral downward to the rear in the first frame portion 32 while coming into contact with the first guide 32C from an outer side of the print tape roll 11 in the radial direction. As illustrated in FIG. 8B, the print tape 11A is further conveyed downward to the left across the first frame portion 32 and the second frame portion 33 in the up-down direction.

Figure 8C:
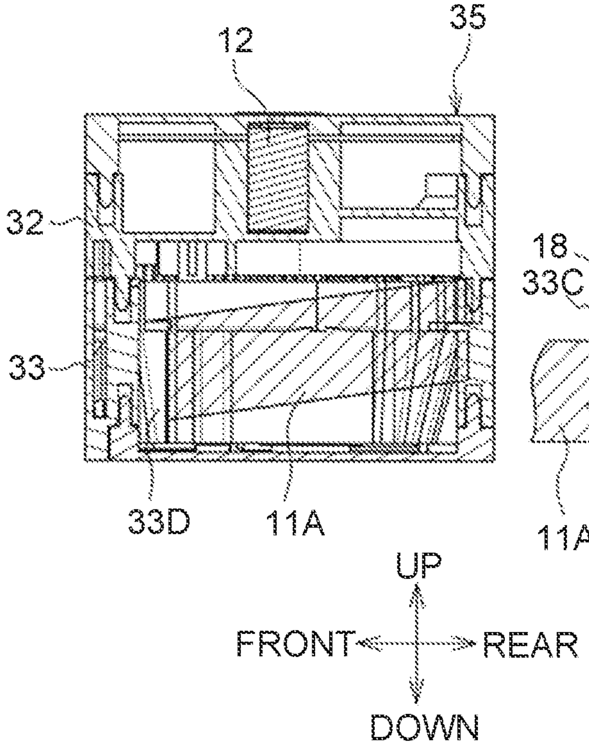
FIG. 8C is a schematic cross-sectional view taken along line of FIG. 2C.
Figure 8D:
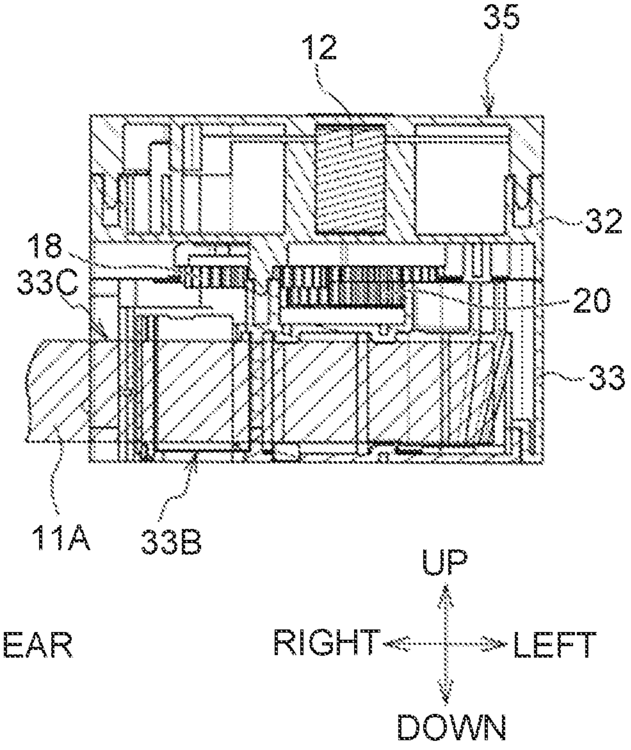
FIG. 8D is a schematic cross-sectional view taken along line of FIG. 2C.

As illustrated in FIG. 8C, the print tape 11A that has reached the second frame portion 33 is conveyed downward to the front while coming into contact with the second guide 33D from the outer side in the radial direction. As illustrated in FIG. 8D, the print tape 11A that has reached the lower end portion of the print cassette 10 passes through the head opening 33B and is discharged from the discharge port 33C.

Tape Conveyance and Printing by Printing Apparatus Main Body

The print head 102 performs printing on the print tape 11A held by the print cassette 10.

In a state in which the print cassette 10 is attached to the printing apparatus main body 100, the print head 102 is disposed at a position overlapping the print tape 11A and the ink ribbon 14A in the front-rear direction in the head opening 33B.

The print tape 11A conveyed to the head opening 33B by the platen roller 103 is pressed via the ink ribbon 14A against the print head 102 in which the heating elements generate heat. As a result, a portion of ink disposed on the front face of the ink ribbon 14A is transferred to the print tape 11A, and characters, symbols, and the like are printed on the print tape 11A.

The platen roller 103 conveys the print tape 11A from inside the print cassette 10 to the outside. The platen roller 103 abuts against the print tape 11A in the head opening 33B and presses the print tape 11A against the print head 102.

Figure 9:
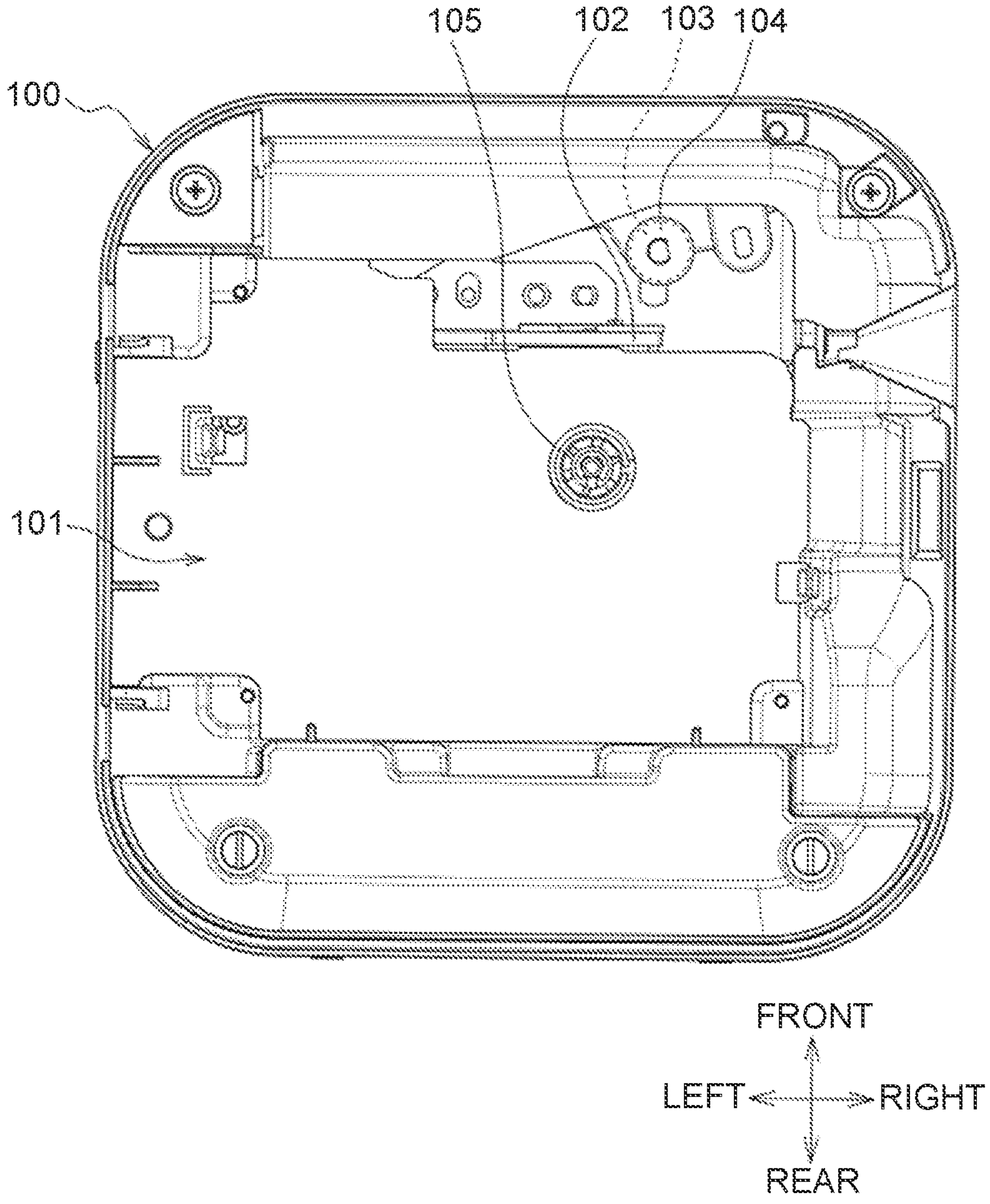
FIG. 9 is a schematic plan view of the printing apparatus main body in the printing apparatus of FIG. 1A.
Figure 10:
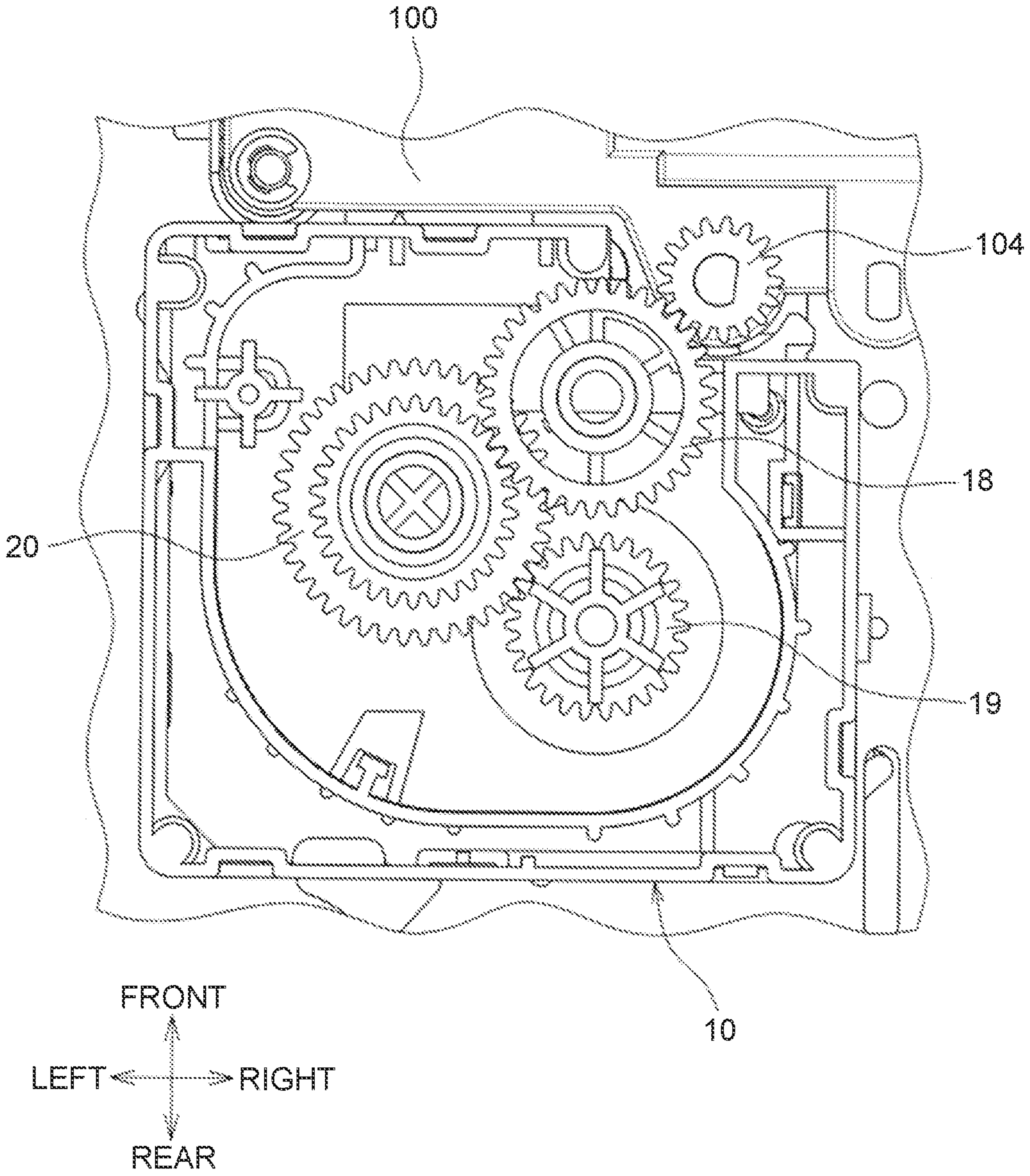
FIG. 10 is a schematic view illustrating an engagement state of an output gear and a platen gear in the printing apparatus of FIG. 1A.

The platen gear 104 is coupled to the platen roller 103 and engages the output gear 18. The platen roller 103 and the platen gear 104 are swingable between a position illustrated in FIG. 9 where they are separated from the print cassette 10 and a position illustrated in FIG. 10 where the platen gear 104 engages the output gear 18.

The drive shaft 105 is inserted into the input spool 16 and the input gear 19, and rotates the input spool 16 and the input gear 19 by engaging the spline tooth 16B with the spool 19B of the input gear 19.

In a state where the print cassette 10 is attached to the printing apparatus main body 100, the drive shaft 105 engages the input gear 19, and the platen gear 104 engages the output gear 18. Specifically, the drive shaft 105 is inserted into the input spool 16 and the input gear 19 of the print cassette 10. Thereafter, the platen roller 103 and the platen gear 104 are swung toward the head opening 33B of the print cassette 10.

When the input gear 19 is rotated by the drive shaft 105 in a state where the print cassette 10 is attached, the output gear 18 is rotated, the platen gear 104 rotates with the rotation of the output gear 18, and the platen roller 103 rotates with the rotation of the platen gear 104.

[1-2. Effects]

According to the embodiment described above in detail, the following effects are obtained.

(1a) Since the input gear 19, the output gear 18 and the idle gear 20, which are for transmitting the driving force, are disposed so as to overlap the print tape roll 11 in the up-down direction, the print cassette 10 can be downsized in the left-right direction and the front-rear direction.

(1b) Since the rotation axis L4 of the first tape spool 12 overlaps the convex envelope P defined by the input gear 19, the output gear 18, and the idle gear 20, the print cassette 10 can be downsized in the left-right direction and the front-rear direction compared to a case where the rotation axis L4 of the first tape spool 12 does not overlap the convex envelope P. Further, the thrust load of the first tape spool 12 is prevented from being transmitted unevenly to one gear shaft.

(1c) Since a portion of the ink ribbon roll 14 and a portion of the input spool 16 overlap the idle gear 20 in the up-down direction and the overlapping portion 20C of the second gear 20B overlaps the print tape roll 11 in the up-down direction, the print cassette 10 can be further downsized in the left-right direction and the front-rear direction.

(1d) Since the rotation axis L8 of the input gear 19, the rotation axis L7 of the output gear 18, and the rotation axis L9 of the idle gear 20 are located between both ends of the head opening 33B in the left-right direction, the print cassette 10 can be further downsized in the left-right direction.

2. Second Embodiment

[2-1. Configuration]

Figure 11A:
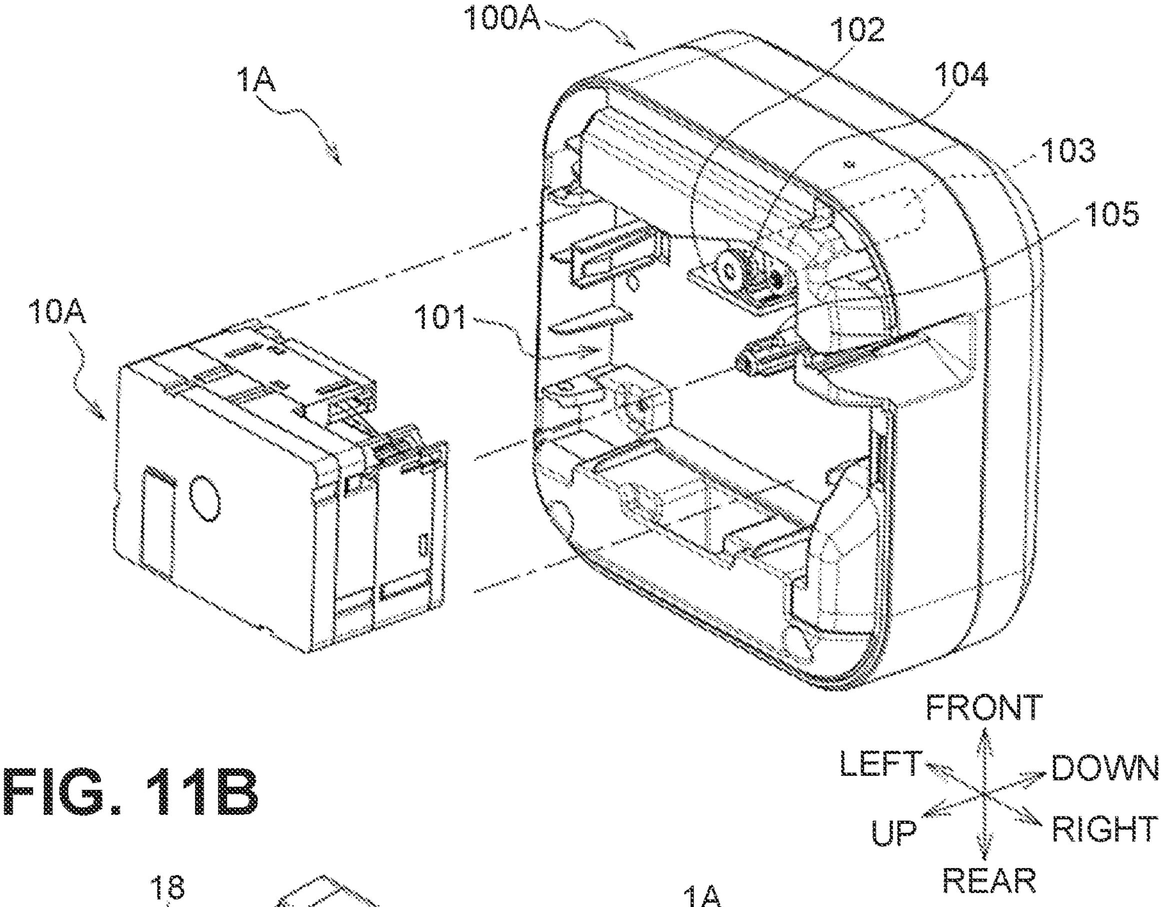
FIGS. 11A and 11B are schematic perspective views illustrating a state in which a print cassette is detached from a printing apparatus main body in a printing apparatus according to an embodiment different from FIG. 1A.
Figure 11B:
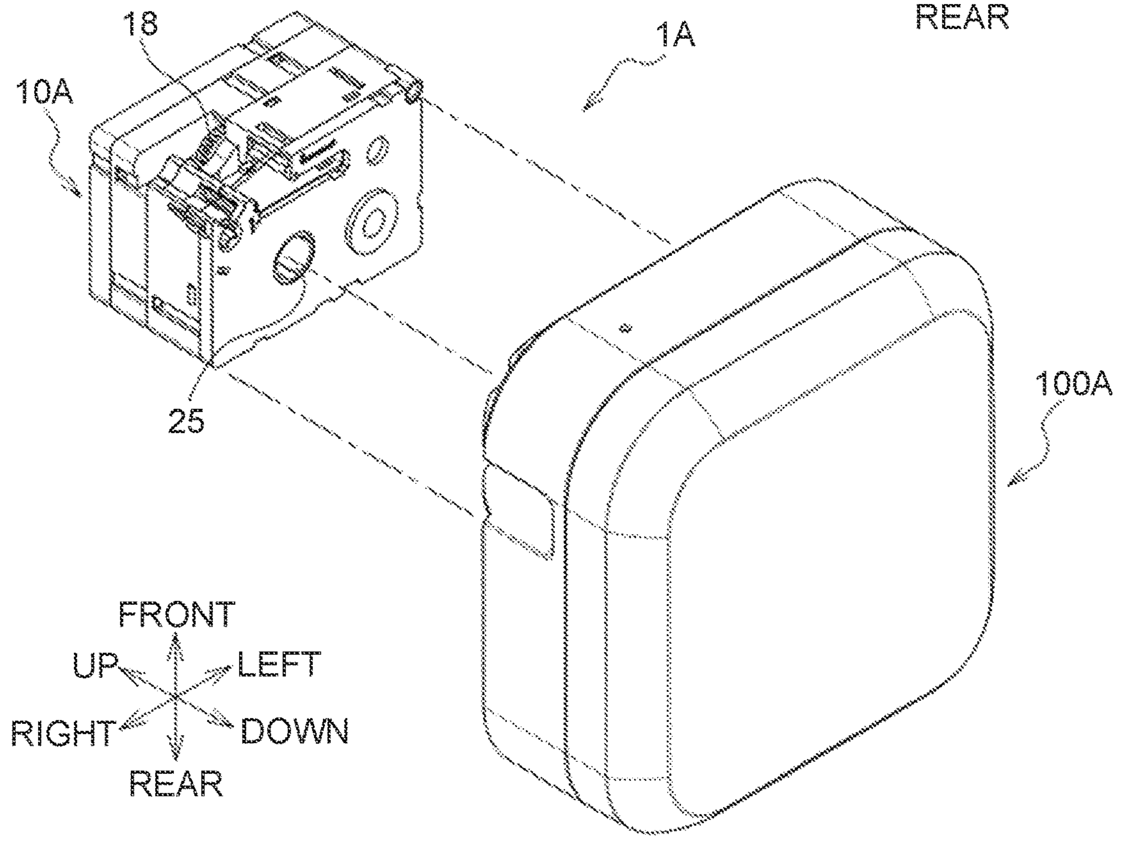

A printing apparatus 1A illustrated in FIGS. 11A and 11B includes a print cassette 10A and a printing apparatus main body 100A.

Print Cassette

Figure 12:
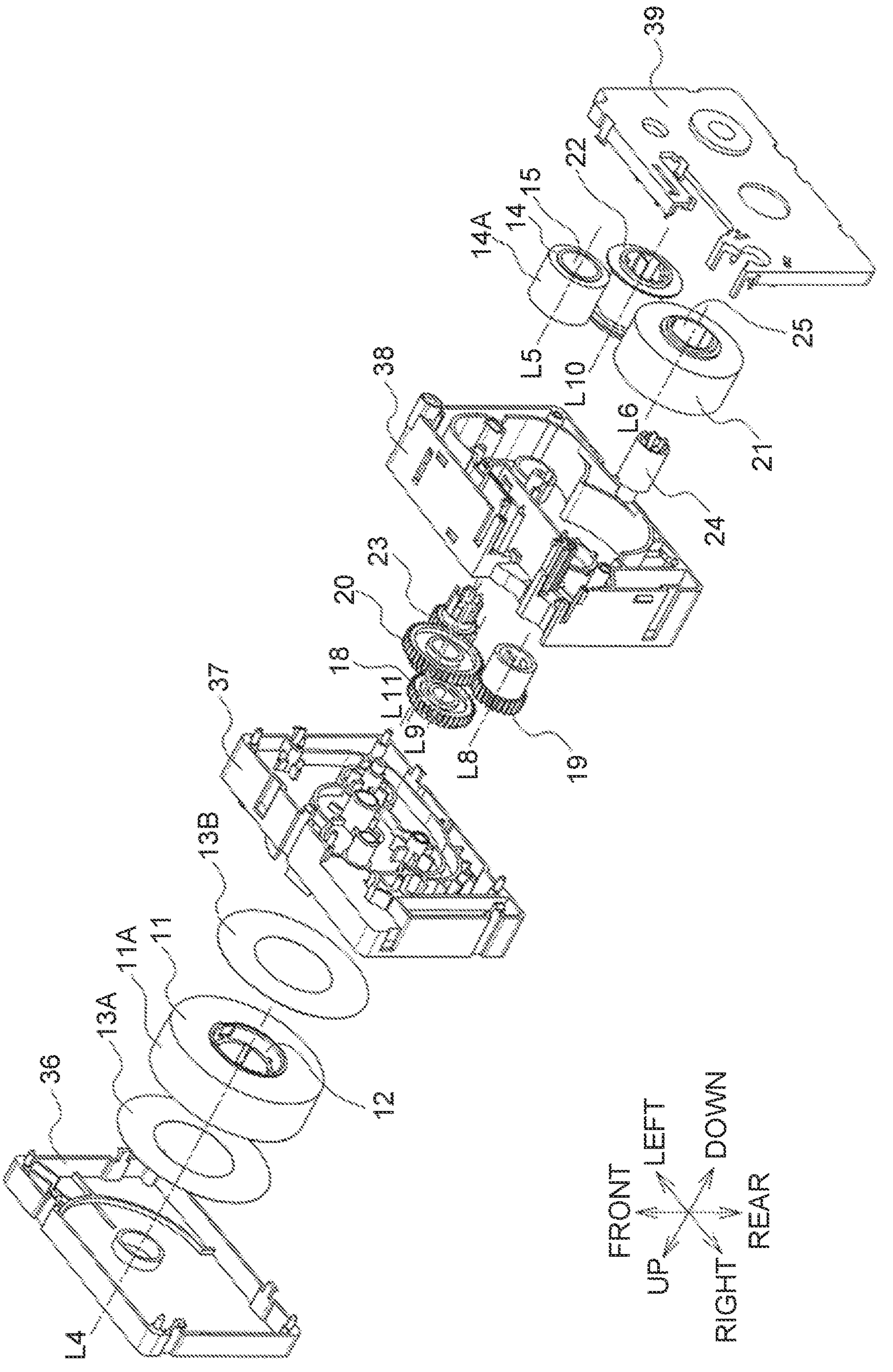
FIG. 12 is a schematic exploded perspective view of the print cassette in the printing apparatus of FIG. 11A.

The print cassette 10A is obtained by adding a laminating tape roll 21, a take-up spool 22, a take-up gear 23, and a pinch roller 24, which are illustrated in FIG. 12, to the print cassette 10 of the first embodiment, and replacing the input spool 16, the first case portion 31, the first frame portion 32, the second frame portion 33, and the second case portion 34 of the first embodiment with a third tape spool 25, a first case portion 36, a first frame portion 37, a second frame portion 38, and a second case portion 39.

The third tape spool 25 is similar to the input spool 16 except that it does not have spline teeth 16B. The first case portion 36, the first frame portion 37, the second frame portion 38, and the second case portion 39 are obtained by extending the first case portion 31, the first frame portion 32, the second frame portion 33, and the second case portion 34 in the left-right direction, respectively. Other configurations of the print cassette 10A are similar to those of the print cassette 10 of the first embodiment except for the points described below, and thus description thereof will be omitted.

In the laminating tape roll 21, the laminating tape is wound around the third tape spool 25. In the laminating tape roll 21, the laminating tape is wound around a winding central axis parallel to the up-down direction. The laminating tape has an adhesive surface to be laminated on the print tape 11A on which printing has been performed by the print head 102.

The take-up spool 22 is rotatable about a rotation axis L10. The rotation axis L10 of the take-up spool 22 is parallel to the rotation axis L5 of the second tape spool 15, that is, parallel to the up-down direction. The take-up spool 22 takes up the ink ribbon 14A taken out from the ink ribbon roll 14 by the rotation of the take-up gear 23.

The take-up gear 23 is coupled to the take-up spool 22 and directly engaged with the idle gear 20. A rotation axis L11 of the take-up gear 23 is located collinearly with the rotation axis L10 of the take-up spool 22.

The take-up gear 23 is rotated by the driving force input to the input gear 19 to rotate the take-up spool 22. The idle gear 20 transmits the driving force input to the input gear 19 to the take-up gear 23.

The pinch roller 24 presses the laminating tape against the print tape 11A after printing together with a pressing roller 106. The pinch roller 24 is disposed downstream of the head opening 33B in the conveyance direction of the print tape 11A.

Figure 13A:
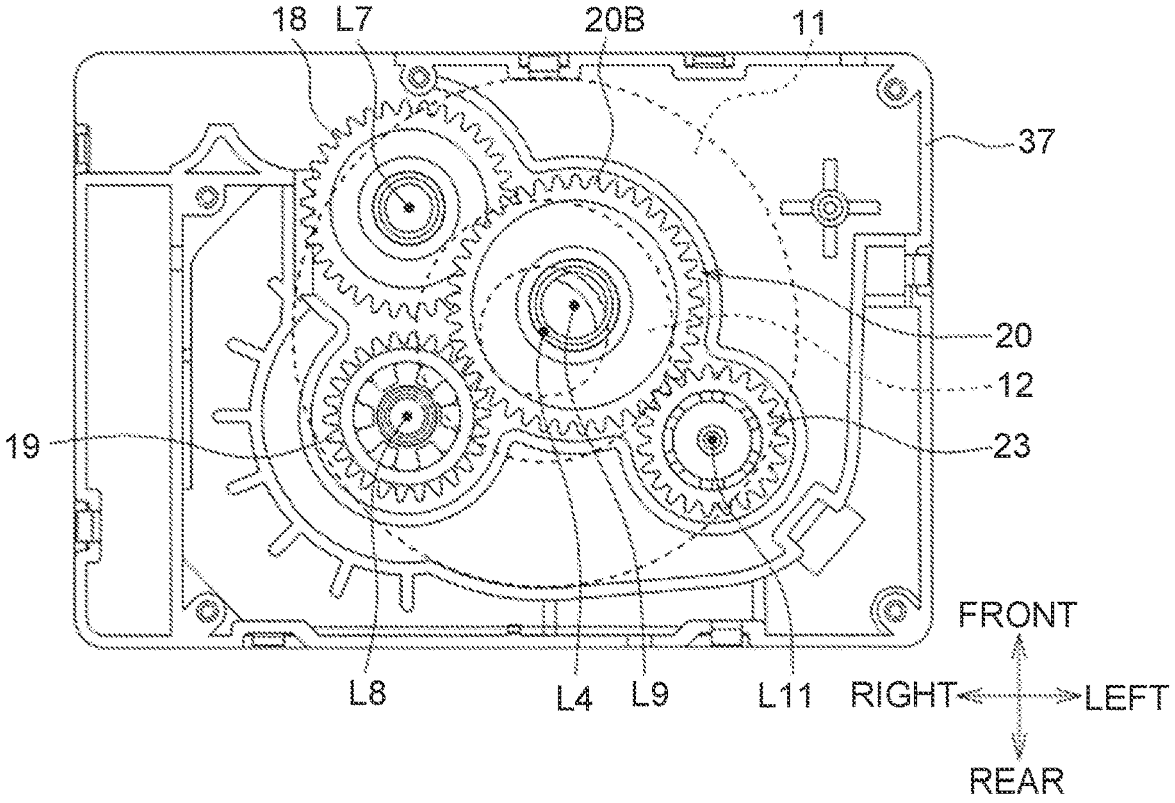
FIGS. 13A and 13B are schematic perspective views illustrating a state of the print cassette of FIG. 11A from which a second frame portion and a second case portion are detached.

As illustrated in FIG. 13A, a portion of the take-up gear 23 overlaps the print tape roll 11 in the up-down direction. A rotation axis L11 of the take-up gear 23 overlaps the print tape roll 11 in the up-down direction.

Figure 13B:
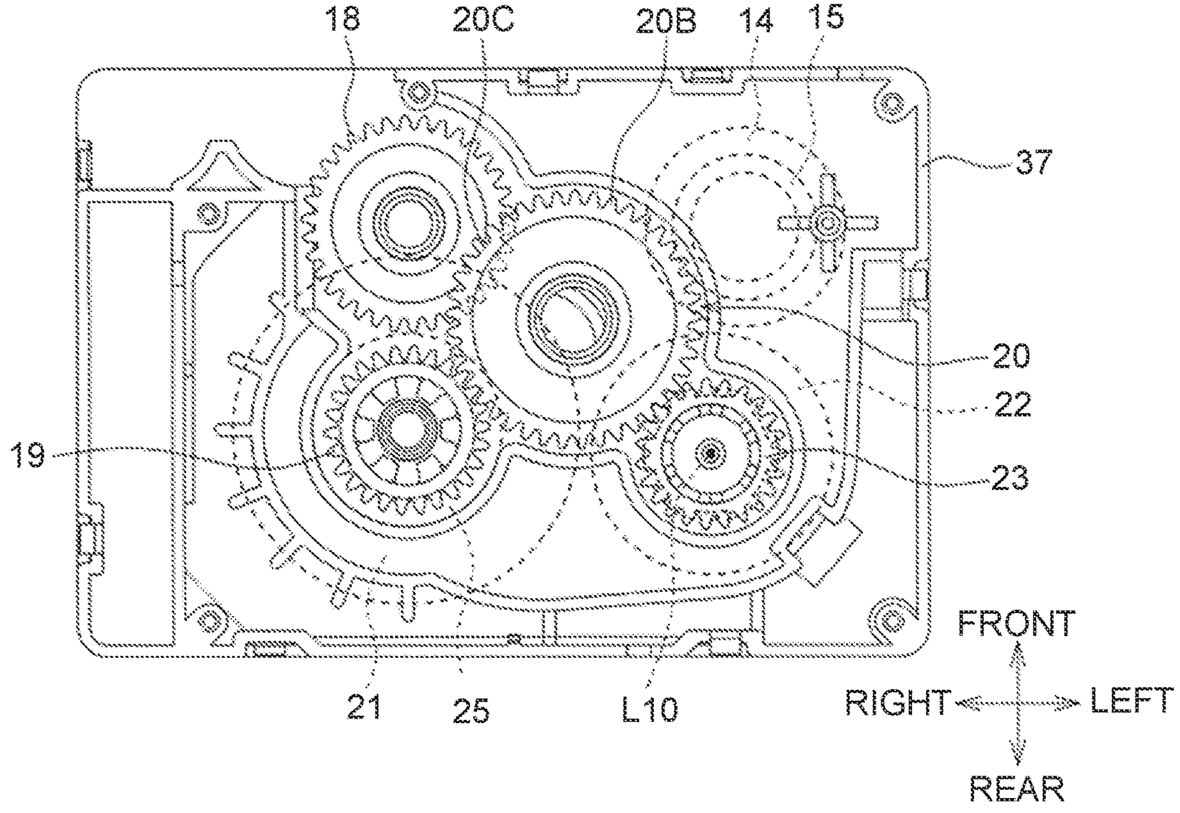

As illustrated in FIG. 13B, a portion of the take-up spool 22 overlaps the idle gear 20 in the up-down direction. The take-up gear 23 overlaps the take-up spool 22 in the up-down direction. The outer edge of the take-up spool 22 illustrated in FIG. 13B includes flanges provided at both ends in the axial direction of the rotation axis L10 of the take-up spool 22.

A portion of the output gear 8 and a portion of the idle gear 20 each overlap the laminating tape roll 21 in the up-down direction. In particular, a portion of the overlapping portion 20C of the second gear 20B of the idle gear 20 overlaps the laminating tape roll 21 in the up-down direction.

Printing Apparatus Main Body

Figure 14:
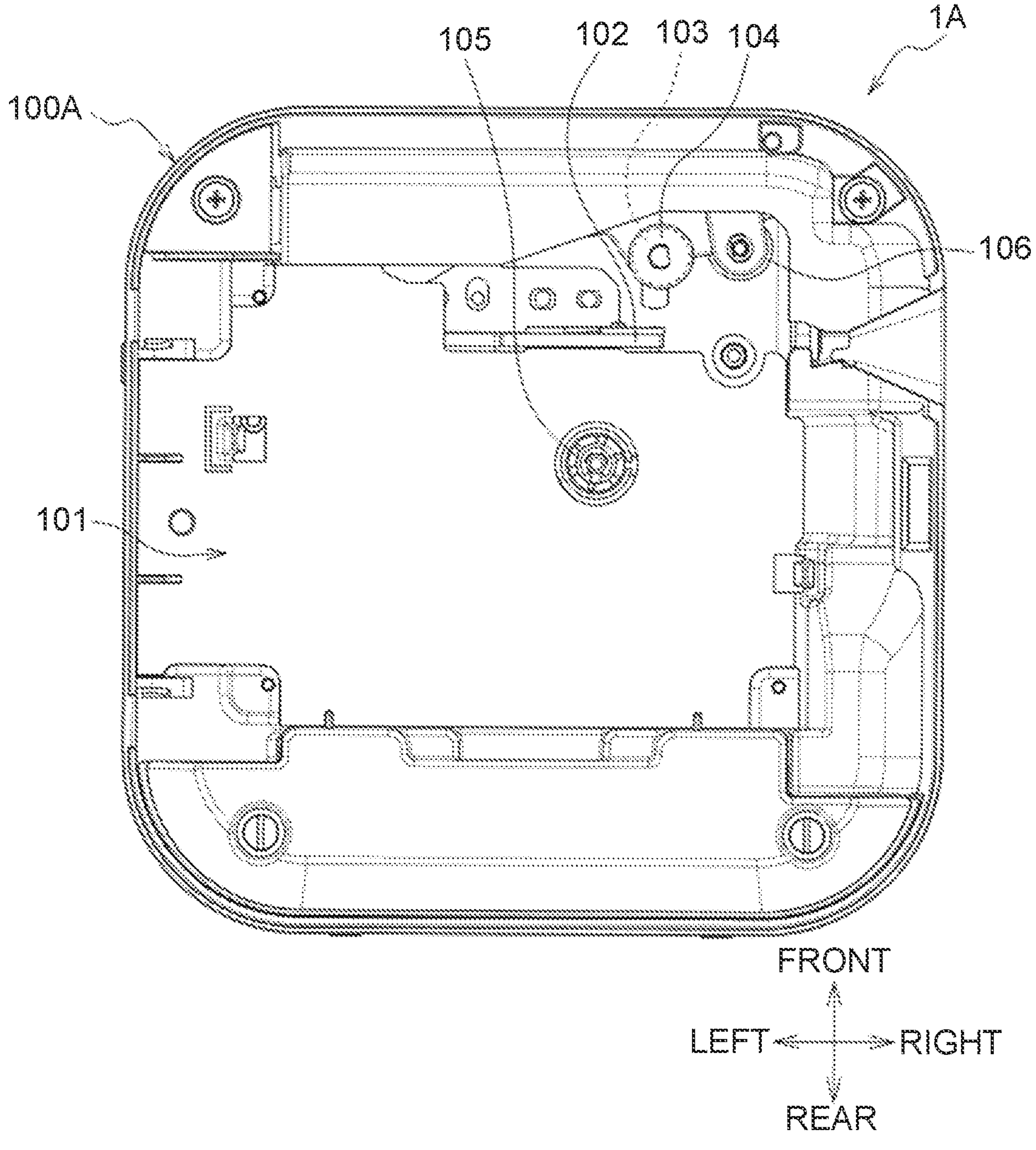
FIG. 14 is a schematic plan view of the printing apparatus main body in the printing apparatus of FIG. 11A.

In the printing apparatus main body 100A, a pressing roller 106 illustrated in FIG. 14 is added to the printing apparatus main body 100 of the first embodiment. Other configurations of the printing apparatus main body 100A are similar to those of the printing apparatus main body 100 of the first embodiment except for the points described below, and thus description thereof will be omitted.

Figure 15:
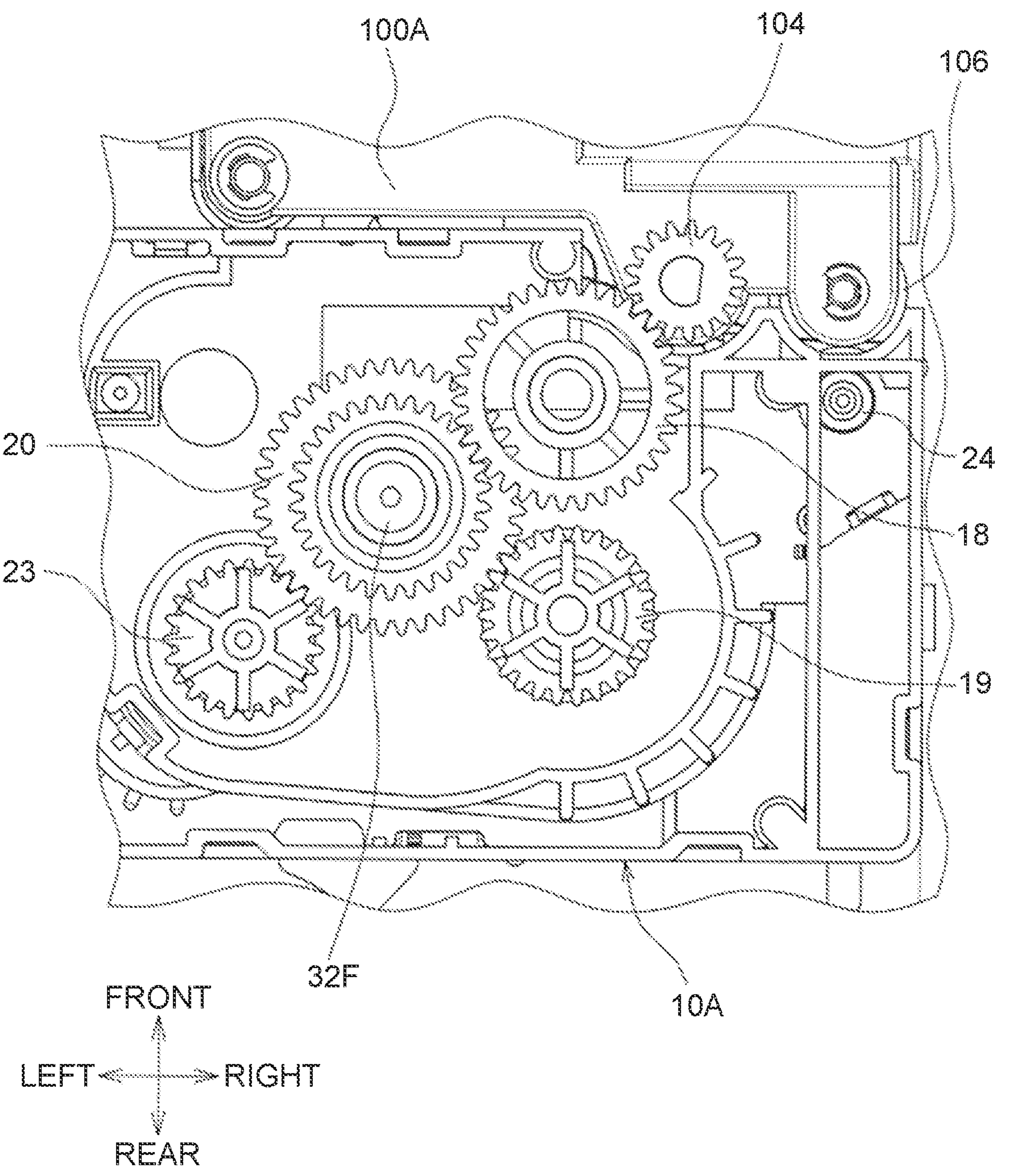
FIG. 15 is a schematic view illustrating an engagement state of an output gear and a platen gear in the printing apparatus of FIG. 11A.

The pressing roller 106 is configured to be swingable together with the platen roller 103 and the platen gear 104. The pressing roller 106 is swingable between a position illustrated in FIG. 14 where it is separated from the print cassette 10A and a position illustrated in FIG. 15 where it presses the print tape 11A and the third tape together with the pinch roller 24.

In this embodiment, the drive shaft 105 is inserted into the hollow portion of the third tape spool 25 (i.e., the laminated tape roll 21) while the print cassette 10A is attached to the printing apparatus main body 100A, and the input gear 19 engages the drive shaft 105.

[2-2. Effects]

According to the embodiment described above in detail, the following effects are obtained.

(2a) Since a portion of the take-up gear 23 and the rotation axis L11 of the take-up gear 23 overlap the print tape roll 11 in the up-down direction, the printed content of the print tape 11A can be protected by the laminating tape while having the same advantages as those of the first embodiment.

(2b) Since a portion of the take-up spool 22 overlaps the idle gear 20 in the up-down direction and the overlapping portion 20C of the second gear 20B of the idle gear 20 overlaps the laminating tape roll 21 in the up-down direction, the print cassette 10A can be further downsized in the left-right direction and the front-rear direction.

3. Other Embodiments

Although the embodiments of the present disclosure have been described above, it is needless to say that the present disclosure is not limited to the above-described embodiments and can take various forms.

(3a) In the printing apparatus of each embodiment described above, the print tape roll, the ink ribbon roll, and the laminating tape roll each do not necessarily have to be wound around a rotatable spool. These rolls each may be wound around a non-rotating member fixed to the case, for example. In addition, these rolls each do not necessarily have to be wound around another member.

(3b) The printing apparatus of each embodiment described above is not limited to an apparatus that performs printing using an ink ribbon. The printing apparatus may use a band-shaped thermal paper instead of the print tape in the first embodiment, and may use a laminating tape (that is, a protective tape) instead of the ink ribbon.

In addition, the printing apparatus may use, as the print tape, a stencil tape on which a printing pattern is perforated by a thermal head, and may use a band-shaped slip sheet that protects and supports the stencil tape instead of the laminating tape. In this case, in the head opening, the print tape may be superimposed on the slip sheet at a position closer to the print head than the slip sheet (that is, as an upper layer), or the print tape may be superimposed on the slip sheet at a position farther from the print head than the slip sheet (that is, as a lower layer).

(3c) In the print cassette of the second embodiment, the positions of the take-up spool and the third tape spool may be changed. That is, the drive shall may be inserted into the take-up spool, and the third tape spool may be rotated by the take-up gear.

(3d) In the print cassette of each embodiment described above, the output gear, the input gear and the take-up gear may engage the idle gear indirectly (i.e., via another gear). Further, the idle gear does not necessarily have to be a stepped gear and may be a single spur gear.

(3e) The functions of one component in each embodiment described above may be distributed as a plurality of components, or the functions of a plurality of components may be integrated into one component. Further, a portion of the configuration of each embodiment described above may be omitted. In addition, at least a portion of the configuration of each embodiment described above may be added to or replaced with another configuration thereof. It should be noted that all aspects included in the technical idea specified by the wording described in the claims are embodiments of the present disclosure.

What is claimed is:

1. A print cassette comprising:

a print tape roll in which a print tape is wound around a winding central axis parallel to a first direction;

an input gear to which an input driving force is to be input from an outside of the print cassette;

an output gear to output an output driving force to the outside of the print cassette; and an idle gear directly or indirectly driven by the input gear and directly or indirectly driving the output gear, wherein at least a portion of the input gear, at least a portion of the output gear, and at least a portion of the idle gear each overlap the print tape roll in the first direction.

2. The print cassette according to claim 1, wherein a rotation axis of the input gear, a rotation axis of the output gear, and a rotation axis of the idle gear are each located more inward than an outer peripheral surface of the print tape roll in a direction perpendicular to the first direction.

3. The print cassette according to claim 1, further comprising a tape spool rotatable about a rotation axis, wherein the print tape roll is configured such that the print tape is wound around the tape spool, wherein, in a projection view in which the tape spool, the input gear, the output gear, and the idle gear are projected onto a virtual plane perpendicular to the first direction, the rotation axis of the tape spool overlaps a convex envelope defined by the input gear, the output gear, and the idle gear.

4. The print cassette according to claim 1, further comprising an ink ribbon roll in which an ink ribbon used for printing of the print tape is wound around a winding central axis parallel to the first direction, wherein at least a portion of the ink ribbon roll overlaps the idle gear in the first direction.

5. The print cassette according to claim 4, further comprising a take-up spool rotatable to take up the ink ribbon to be supplied from the ink ribbon roll, wherein at least a portion of the take-up spool overlaps the idle gear in the first direction.

6. The print cassette according to claim 5, further comprising a take-up gear directly or indirectly engaging the idle gear to rotate the take-up spool, wherein at least a portion of the take-up gear overlaps the print tape roll in the first direction.

7. The print cassette according to claim 6, wherein a rotation axis of the take-up gear overlaps the print tape roll in the first direction.

8. The print cassette according to claim 7, wherein the take-up gear overlaps the take-up spool in the first direction.

9. The print cassette according to claim 1, wherein idle gear is a stepped gear in which a first gear engaging the output gear and a second gear having a larger diameter than the first gear are aligned, wherein the second gear has an overlapping portion that overlaps the output gear in the first direction, and wherein at least a portion of the overlapping portion overlaps the print tape in the first direction.

10. The print cassette according to claim 9, further comprising a laminating tape roll in which a laminating tape to be laminated on the print tape is wound around a winding central axis parallel to the first direction, wherein at least a portion of the overlapping portion of the second gear overlaps the laminating tape roll in the first direction.

11. The print cassette according to claim 1, further comprising a case in which at least a portion of the input gear, at least a portion of the output gear, and at least a portion of the idle gear are housed, wherein the case has a recessed portion that is recessed in the first direction and extends from a first end to a second end in a second direction perpendicular to the first direction, and wherein a rotation axis of the input gear, a rotation axis of the output gear, and a rotation axis of the idle gear are each located in a region that overlaps the recessed portion, the region spans a distance between the first and second ends of the recessed portion in the second direction and extends away from the recessed portion in a third direction.

12. The print cassette according to claim 1, further comprising a laminating tape roll in which a laminating tape to be laminated on the print tape is wound around a winding central axis parallel to the first direction, wherein at least a portion of the output gear and at least a portion of the idle gear are each overlap the laminating tape roll in the first direction.

13. The print cassette according to claim 1, further comprising:

a case configured to be detachably attached to a printing apparatus.

14. The print cassette according to claim 13, wherein the input gear is configured to receive the input driving force from the printing apparatus, and wherein the output gear is configured to output the output driving force to the printing apparatus.

15. The print cassette according to claim 13, wherein at least a portion of the input gear, at least a portion of the output gear, and at least a portion of the idle gear are housed in the case.

16. The print cassette according to claim 1, further comprising:

a case in which the input gear, the output gear, and the idle gear are housed, wherein a portion of the input gear and a portion of the output gear are exposed from the case.

* * * * *